(12) United States Patent
Holcomb

(10) Patent No.: US 9,457,403 B2
(45) Date of Patent: Oct. 4, 2016

(54) SINTERING METHOD AND APPARATUS

(75) Inventor: Matthew J. Holcomb, Metamora, MI (US)

(73) Assignee: Grid Logic Incorporated, Metamora, MI (US)

( * ) Notice: Subject to any disclaimer, the term of this patent is extended or adjusted under 35 U.S.C. 154(b) by 1123 days.

(21) Appl. No.: 13/532,717

(22) Filed: Jun. 25, 2012

(65) Prior Publication Data

US 2012/0329659 A1   Dec. 27, 2012

Related U.S. Application Data

(60) Provisional application No. 61/500,298, filed on Jun. 23, 2011.

(51) Int. Cl.
    *B22F 3/105*    (2006.01)
    *B22F 3/00*     (2006.01)
    *B22F 7/06*     (2006.01)
    *H05B 6/10*     (2006.01)

(52) U.S. Cl.
CPC ............ *B22F 3/1055* (2013.01); *B22F 3/00* (2013.01); *B22F 7/06* (2013.01); *H05B 6/10* (2013.01); *B22F 2003/1057* (2013.01); *Y02P 10/295* (2015.11)

(58) Field of Classification Search
None
See application file for complete search history.

(56) References Cited

U.S. PATENT DOCUMENTS

| | | | |
|---|---|---|---|
| 3,241,956 A * | 3/1966 | Inoue | B22F 3/105 219/149 |
| 3,894,892 A | 7/1975 | Conta | |
| 4,185,183 A | 1/1980 | Kamimoto | |
| 4,231,796 A * | 11/1980 | Clark | B22F 3/105 419/19 |
| 4,720,615 A | 1/1988 | Dunn | |
| 6,533,995 B1 | 3/2003 | Wullenweber et al. | |
| 2009/0317279 A1 | 12/2009 | Wakade | |

FOREIGN PATENT DOCUMENTS

| | | |
|---|---|---|
| EP | 0583124 | 2/1994 |
| JP | 2002-012902 | 1/2002 |
| KR | 2010 0055758 | 5/2010 |
| WO | 2007/114895 | 10/2007 |

OTHER PUBLICATIONS

International Search Report and Written Opinion mailed on Dec. 20, 2012, International Application No. PCT/US2012/044085, filed Jun. 25, 2012.

\* cited by examiner

*Primary Examiner* — George Wyszomierski
*Assistant Examiner* — Ngoclan T Mai
(74) *Attorney, Agent, or Firm* — Stephen M. De Klerk

(57) ABSTRACT

A sintering apparatus comprising a container for holding small particles that contact one another, an electric current generator generating an alternating electric current and a flux concentrator having a collector positioned to be exposed to an alternating magnetic field generated by the alternating electric current and a tip that focuses the alternating magnetic field so that the particles are exposed to the alternating magnetic field, the alternating magnetic field heating surfaces of the particles so that they join and are fused together.

16 Claims, 21 Drawing Sheets

(a) Bulk Heating (b) Surface Heating (c) Poor Heating

SINTERING METHOD AND APPARATUS

CROSS-REFERENCE TO RELATED APPLICATIONS

This application claims priority from U.S. Provisional Patent Application No. 61/500,298, filed on Jun. 23, 2011, all of which is incorporated herein by reference in its entirety.

BACKGROUND OF THE INVENTION

1. Field of the Invention

This invention relates to a sintering apparatus and its use.

2. Discussion of Related Art

It has become common place to fabricate three-dimensional components using Computer Numerical Control (CNC) systems. State of the art solid freeform fabrication (SFF) methods span a number of technologies including stereolithography, 3D printing, selective laser sintering, direct metal deposition, electron beam melting, and microplasma powder deposition. Thermoplastic-based SFF technologies allow designers to verify product design with three-dimensional models at an early stage, but are not capable of fabricating high-strength end products. In principle, metal-based SFF technologies allow for the rapid manufacture of structurally sound, dimensionally accurate metallic parts directly from computer aided design (CAD) models. Laser-based SFF technologies (e.g. DMD and SLS) are highly dependent on specific process parameters to achieve structurally sound parts. These process parameters are specific to the composition, morphology, and materials properties of the metallic powder, as well as the characteristics of the laser beam used to consolidate the powder. Selective Laser Sintering (SLS) and Direct Metal Deposition (DMD) are examples of three-dimensional additive manufacturing systems wherein a high power laser is used to fuse components or particles, such as metal powders or ceramic/metal composite powders, to one another as a means of building up a macroscopic part. These components or particles to be fused may be located in a dense particle bed, as in SLS, or may be entrained in a gas flow and fused in a weld pool on the surface of the part being manufactured, as in DMD. However, in both SLS and DMD technologies, the entire unfused components or particles that comprise the powdered material is heated indiscriminately by the high intensity laser beam. In certain applications, such as when the powdered material includes a ceramic component, the laser may cause thermal decomposition of the ceramic part resulting in the degradation of the physical characteristics of the macroscopic part.

SUMMARY OF THE INVENTION

The invention provides a method of sintering small particles, including holding the particles in contact with one another, generating an alternating electric current and exposing the particles to an alternating magnetic field generated by the alternating electric current so that they heat and join.

The invention also provides a sintering apparatus including a container for holding small particles that contact one another, an electric current generator generating an alternating electric current, and a flux concentrator having a collector positioned to be exposed to an alternating magnetic field generated by the alternating electric current and a tip that focuses the alternating magnetic field so that the particles are exposed to the alternating magnetic field, the alternating magnetic field heating at least surfaces of the particles so that they join.

The invention further provides a method to tightly couple the sintering method to the part or particles in contact with on another. In this method, the characteristics of the part or particles that comprise the powder (e.g. resistivity, magnetic permeability, domain size, etc.) are critical to the efficiency of the heating and sintering of the particles. Unlike other additive manufacturing methods that indiscriminately heat the metal powder, the heating method is specific to the composition and particle size distribution of the powdered material.

The invention further provides a method of sintering, including holding small particles and a part in contact with one another, pre-heating the part by generating an alternating electric current and exposing the part to an alternating magnetic field generated by the alternating electric current, and heating only a portion of the particles that are in contact with the part so that the particles of the portion join with the part.

The invention further provides a sintering apparatus including a container for holding small particles and a part that contact one another, a pre-heater that includes an electric current generator generating an alternating electric current, and a coil generating an alternating magnetic field generated so that the part is exposed to the alternating magnetic field of the coil, the alternating magnetic field heating the part, and a localized heater heating only a portion of the so that the particles of the portion join with the part.

BRIEF DESCRIPTION OF THE DRAWINGS

The invention is further described by way of examples with reference to the accompanying drawings, wherein:

FIG. 13a illustrates a particle distribution having primary small particles;

FIG. 13b illustrates a frequency that is required for sintering the particles of FIG. 13a;

FIG. 13c illustrates a particle distribution having larger particles;

FIG. 13d illustrates the frequencies required for sintering the particles of FIG. 13c;

FIG. 14a illustrates a particle distribution having primarily particles of a small size and particles of a large size;

FIG. 14b illustrates the frequencies required for sintering the particles in FIG. 14a;

FIG. 14c illustrates a more complex particle distribution having particles of multiple sizes;

FIG. 14d illustrates the frequencies required for sintering the particles of FIG. 14c;

FIG. 15a illustrates particles of approximately the same size, but differing in number;

FIG. 15b illustrates the frequencies required for sintering the particles of FIG. 15a;

FIG. 15c illustrates particles of different types and sizes;

FIG. 15d illustrates frequencies required at time t1 and t2 for sintering the particles of FIG. 15c;

FIG. 16b is a perspective view of the sintering apparatus of FIG. 16a;

DETAILED DESCRIPTION OF THE INVENTION

The terms "powder" and "particles" are used interchangeably herein. It will be understood that a powder includes small particles of varying sizes and that very small particles can agglomerate and form a powder of varying sizes when held together.

3D Additive Manufacturing Via Micro-Induction Sintering

A solid free form (SFF) manufacturing method is described herein. A small-scale induction heating transducer includes a high frequency current source and a magnetic flux concentrator that applies a spatially compact high frequency magnetic field to a dense powder bed with a CNC system. Three-dimensional, structurally sound metallic parts will be manufactured in this system through the layer-by-layer induction sintering of a dense metallic powder bed. This additive manufacturing method is referred to herein as "micro-induction sintering" or "MIS."

Background: Induction Heating of Metals

Induction heating is a common industrial process in which a metallic part is heated by absorbing energy from an alternating magnetic field in which the part is immersed. Heating occurs within the metal part via two mechanisms: eddy current heating and hysteresis heating. Eddy current heating occurs in all conductive materials when they are placed in an alternating magnetic field. The alternating magnetic field induces current in the metallic part, which in turn produces heat due to the electrical resistance of the material. Hysteresis heating occurs in magnetic materials and arises from the movement of magnetic domains resulting from the applied alternating magnetic field. Hysteresis heating is zero in non-magnetic materials.

In all conductive materials heated by induction, the induced eddy currents decay exponentially with distance from the surface from the surface of the metal part. The skin depth ($\delta$) of a conductive material is defined as the length at which the eddy current density falls to (1/e) of its value at the surface (i.e. ~37%). This distance depends only on the electromagnetic properties of the material and the frequency of the applied magnetic field. For good conductors, the skin depth can be written as:

$$\delta = \sqrt{\frac{\rho}{\pi f \mu}} \quad [1]$$

wherein $\rho$ is the resistivity of the material, f is the frequency of the alternating magnetic field, and $\mu$ is the magnetic permeability of the material. The magnetic permeability of non-magnetic materials, $\mu_0$, is defined as $4\pi \times 10^{-7}$ (Tesla meter/Amp). For magnetic materials, $\mu = \mu_0 \mu_r$, where $\mu_r$ is the relative permeability. The relative permeability of magnetic materials may exceed $10^4$ for small magnetic fields, but tends towards unity with sufficiently high magnetic field strength.

Figure 1:
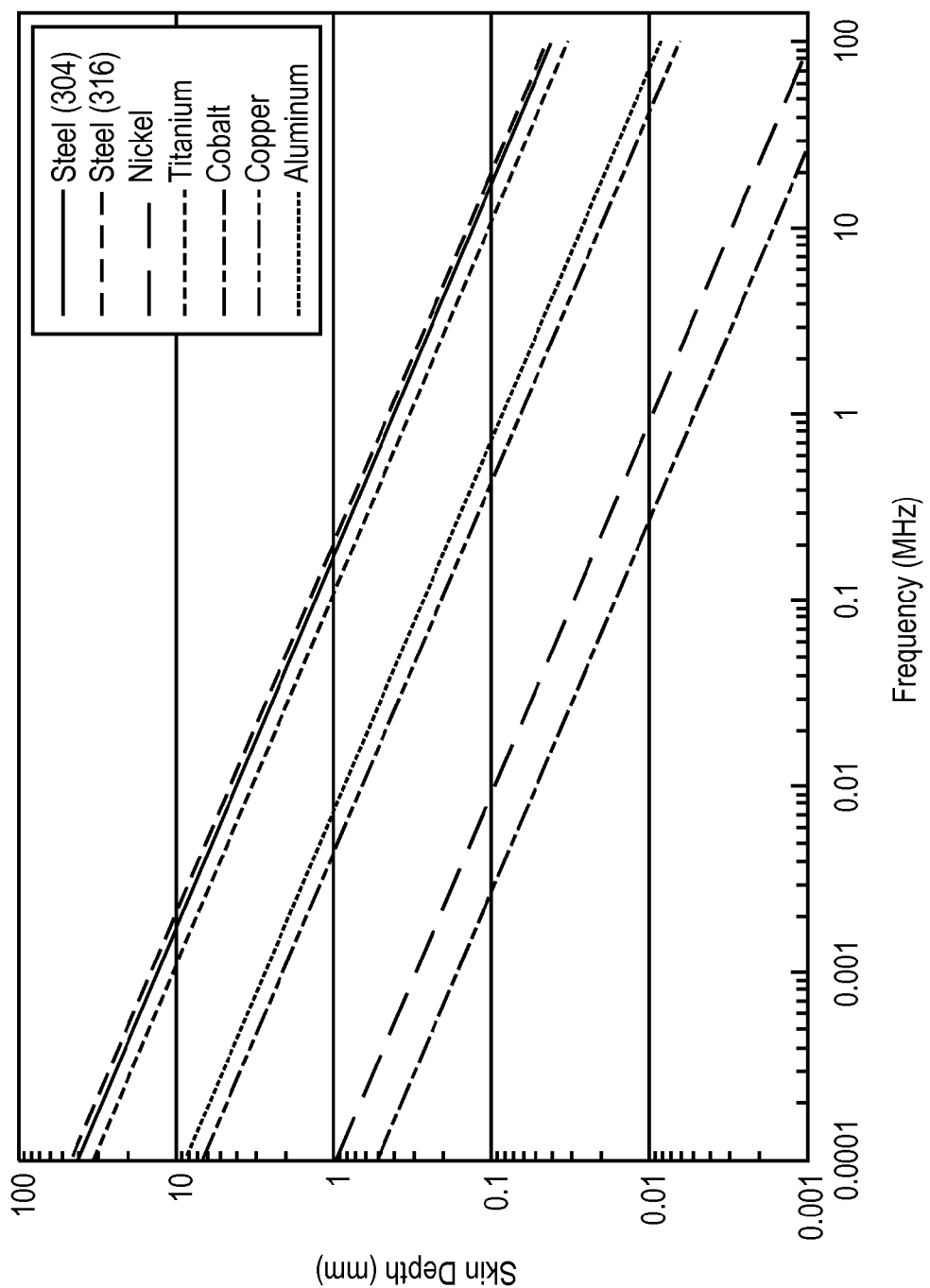
FIG. 1 is a graph illustrating variation of skin depth versus frequency for a number of conductive materials.

FIG. 1 shows the variation of skin depth versus frequency for a number of conductive materials. In general, the skin depth increases with increasing resistivity and decreases with increasing magnetic permeability. Independent of the specific materials properties of the metal, the skin depth always decreases with increasing frequency of the applied magnetic field.

Consider a conductive non-magnetic material immersed in an alternating magnetic field. Eddy currents are known to decay exponentially from the surface are approximately 37% of the value at the surface of the material at $\delta$. Induction heating within the material is proportional to the square of the eddy current density (i.e. "$I^2R$" heating) and is reduced to approximately 13% of its value on the surface of the material at $\delta$. Thus, essentially all inductive heating occurs within $\delta$ of the surface of a material. Because of this, the frequency of the applied magnetic field in an induction heating process is critical to the effective heating of a metallic part. With fixed materials characteristics (e.g. $\rho$, $\mu$, and dimensions) the frequency of the induction process determines how effectively power can be absorbed from the alternating magnetic field.

Figure 2:
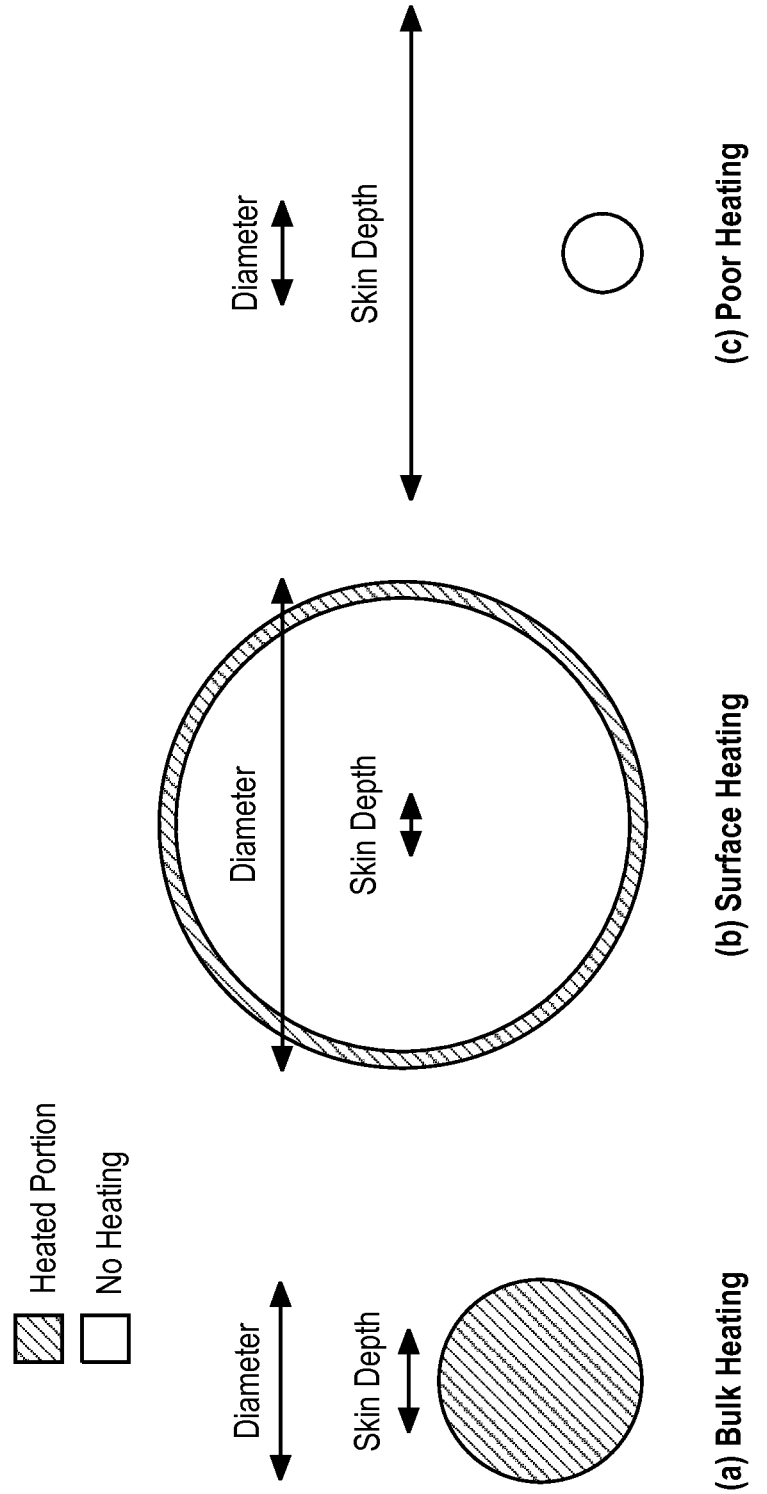
FIGS. 2a, 2b and 2c illustrate the effect of skin depth on the manner in which a small particle is heated.

In FIG. 2a, the cross-dimension of the part is approximately $2\delta$. In this case, the eddy currents penetrate deep into the part and bulk heating occurs via induction. In FIG. 2b, the dimension of the part is much larger than $\delta$. Here, only the surface of the part is heated via induction, which is common in the surface hardening of gears, for example. In FIG. 2c, the skin depth is much larger than the dimension of the part. In this case, the part does not couple well to the alternating magnetic field and the material absorbs very little power. When $\delta$ is much greater than the dimension of the metallic part, the part is said to be magnetically "transparent" to the induction heating process.

For simple shaped (e.g. flat or cylindrical) materials placed in a uniform alternating magnetic field, the power absorbed by the part ($P_w$) can be written as:

$$P_w = \frac{\rho}{\delta} AKH^2 = AKH^2 \sqrt{\pi\mu\rho} \quad [2]$$

wherein ρ is the resistivity of the material, δ is the skin depth, A is the part surface exposed to the magnetic field, K is a power transfer factor that depends on part geometry, and H is the magnetic field strength. In principle, it is possible to calculate the power absorbed by a given metallic part in an induction heating process using modern finite element analysis methods. As a rule of thumb, given a material's resistivity, magnetic permeability, and dimensions, the power absorbed by the part in an induction heating process increases with increasing frequency and magnetic field strength.

In general, macro-scale conductive part s have been processed using low frequency (i.e. <100 kHz) induction heating methods. In principle, induction processing can be used to provide volumetric heating of micro-scale metallic powders provided that the particle size is on the order of the skin depth, which necessitates the use of high frequency (i.e. >100 kHz) alternating magnetic fields for 50 μm to 100 μm size conductive particles. Under these conditions, the sintering process is greatly enhanced and the absorbed energy results in the formation of a dense metallic solid. If the high frequency magnetic field is confined to a small spatial area, localized sintering of the powder will occur. This is similar to the localized sintering that occurs in SLS additive manufacturing methods.

Micro-Scale Induction Sintering of Metallic Powders: 3D Additive Manufacturing

Figure 3:
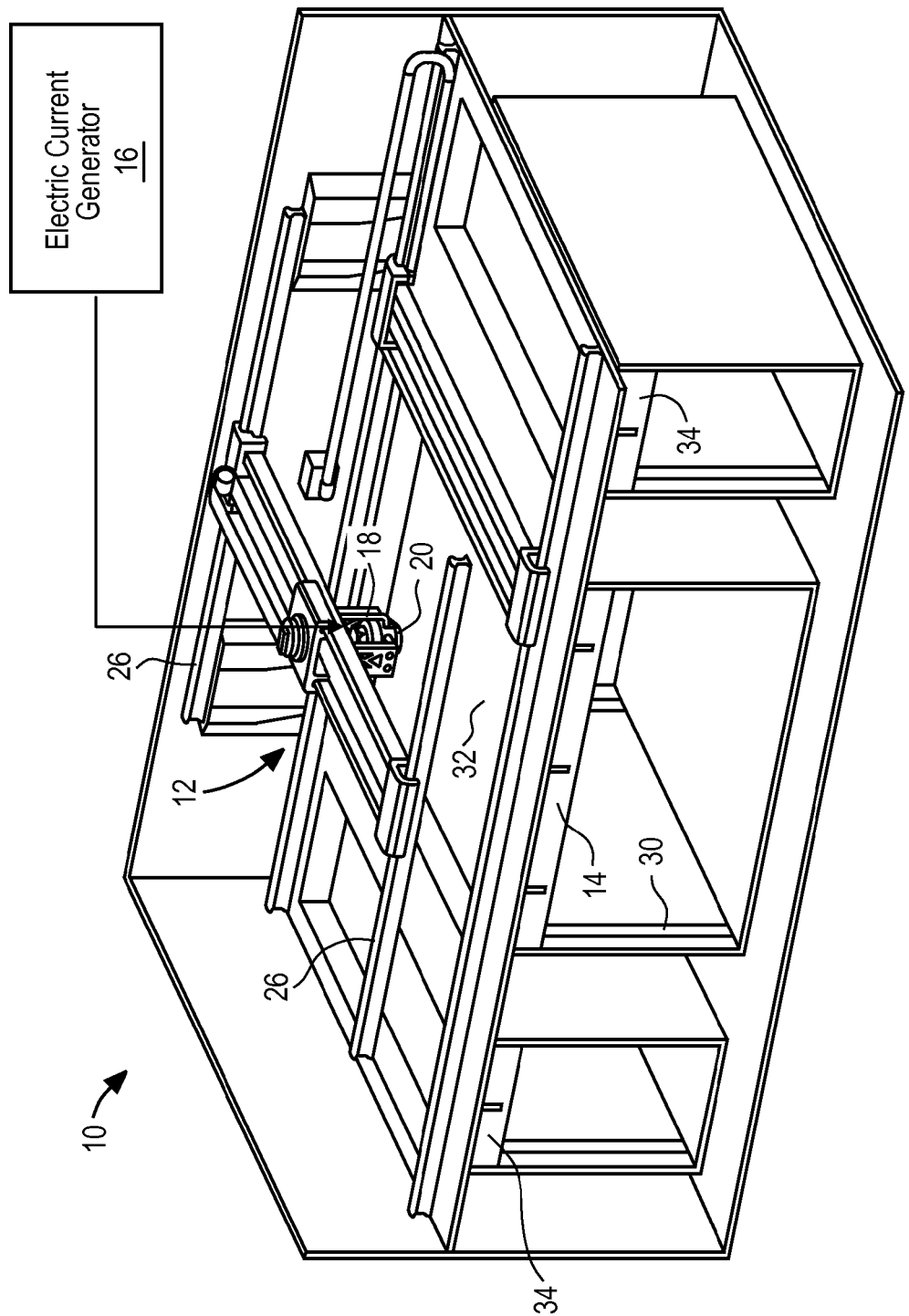
FIG. 3 is perspective view of a sintering apparatus according to the embodiment of the invention.

FIG. 3 illustrates an MIS apparatus 10 according to an embodiment of the invention. The apparatus 10 includes a system 12 for creating relative movement in three-dimensions, a container 14, an electric current generator 16, a high frequency electric lead 18, and a flux concentrator 20. The entire apparatus 10 resides in a controlled atmosphere environment.

The system 12 includes a frame 24, first and second tracks 26, a boom 28, and a plurality of rails 30. The tracks 26 are mounted to the frame 24 on opposing sides thereof and extend in an x direction. The boom 28 is mounted between the rails 30 and extends in a y direction. The boom 28 is movable in the x direction on the rails 30. An actuator (not shown) moves the boom 28 horizontally on the rails 30 in the x direction. The flux concentrator 20 is mounted to the boom 28 for movement in the y direction on the boom 28. An actuator (not shown) moves the flux concentrator 20 horizontally on the boom 28 in the y direction.

The container 14 is a horizontal bed with sides for containing and holding small particles 32 that contact one another. The rails 30 extend in a vertical z direction. The container 14 is mounted to the rails 30 for movement up and down in the vertical z direction. An actuator (not shown) moves the container 14 up and down the rails 30 in the vertical z direction.

The apparatus 10 further includes two powder reservoirs 34. The powder reservoirs 34 are also movable in a vertical z direction. By raising the powder reservoirs 34 and/or lowering the container 14, a height differential can be created between the particles 32 in the container 14 and particles held in the powder reservoir 34 so that particles can be scraped from the powder reservoirs 34 into and over the particles 32 already in the container 14.

It can thus be seen that the system 12 provides for movement in three-dimensions of the flux concentrator 20 relative to the particles 32. In use, a thin layer of particles 32 is scraped from the reservoirs 34 onto the container 14. The electric current generator 16 is connected through the lead 18 to the flux concentrator 20. When the electric current generator 16 is operated, it generates an alternating electric current and provides the alternating electric current through the lead 18 to an area adjacent the flux concentrator 20. The flux concentrator 20 then focuses an alternating magnetic field generated by the alternating magnetic current within a small first portion of the particles 32. The alternating magnetic field heats the particles so that they join. Joining of the particles occurs due to grain flow. The flux concentrator 20 is then moved in x and/or y directions so that the alternating magnetic field is reduced from the first portion of the particles while exposing a second, adjacent portion of the particles to the alternating magnetic field. A reduction in the alternating magnetic field strength at the first portion of particles that has been joined allows the first portion to cool. In reality, there is a transition from the first portion to the second portion, and then to a third portion and so on so that an elongate part part can be formed. The elongate part can have a two-dimensional profile in x and y directions.

After the part is formed within the particles 32, the container 14 is lowered and a new layer of particles is scraped onto the particles 32 from the reservoirs 34. The process hereinbefore described is then repeated. The particles that are heated in the second cycle are not only fused to one another, but are also fused to the part that has been manufactured in the first cycle. Should a circular plate for example be manufactured during the first cycle, the second cycle will add another layer to the circular plate and if the process is repeated, a cylinder may be manufactured. It may also be possible to manufacture more complex, three-dimensional shapes in this manner.

Figure 4:
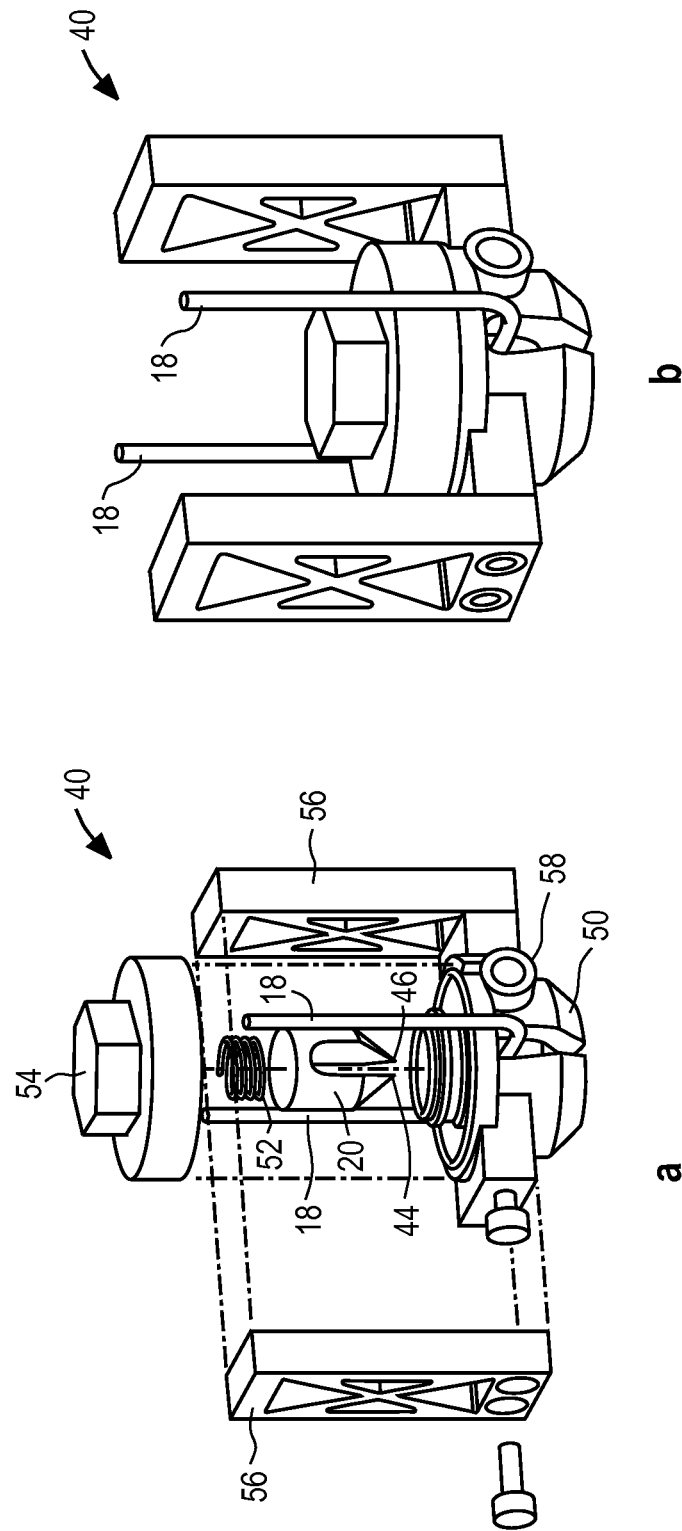
FIGS. 4a and 4b are exploded and assembled views, respectively, of an assembly that forms part of the sintering apparatus.

FIGS. 3, 4a and 4b illustrate an assembly 40 that achieves localized metallic powder consolidation by a high frequency magnetic field that is directed on the powder bed. The assembly 40 includes the lead 18 and the flux concentrator 20. The flux concentrator 20 has a collector 42 and a tip 44. The flux concentrator 20 has a gap 46 that extends from the tip 44 up into the collector 42. The gap 46 is placed over a section of the lead 18 and moved into a position wherein the section of the lead 18 extends through the collector 42. The collector 42 is then exposed to the alternating magnetic field generated by the alternating electric current in the section of the lead 18. The tip 44 focuses the alternating magnetic field so that the particles 32 in FIG. 3 are exposed to the alternating magnetic field.

The assembly 40 further includes a water cooler 50, a spring 52, a cap 54 and opposing mounts 56. The water cooler 50 has a water passage 58 therethrough. When water runs through the water passage 58, the water cooler 50 can remove heat from the flux concentrator 20. The flux concentrator 20 is placed within the water cooler 50 with the spring 52 on top. The cap 54 is then placed on the spring 52 and secured to the water cooler 50. The spring 52 is thereby compressed. A spring force created by the spring 52 ensures good contact between surfaces of the flux concentrator 20 and the water cooler 50 so that heat can conduct from the flux concentrator 20 to the water cooler 50. The mounts 56 are secured to the water cooler 50 and are used for securing the assembly 40 to a part of the system 12 in FIG. 3 that allows for movement of the assembly 40 along the boom 28 in the y direction.

Figure 5:
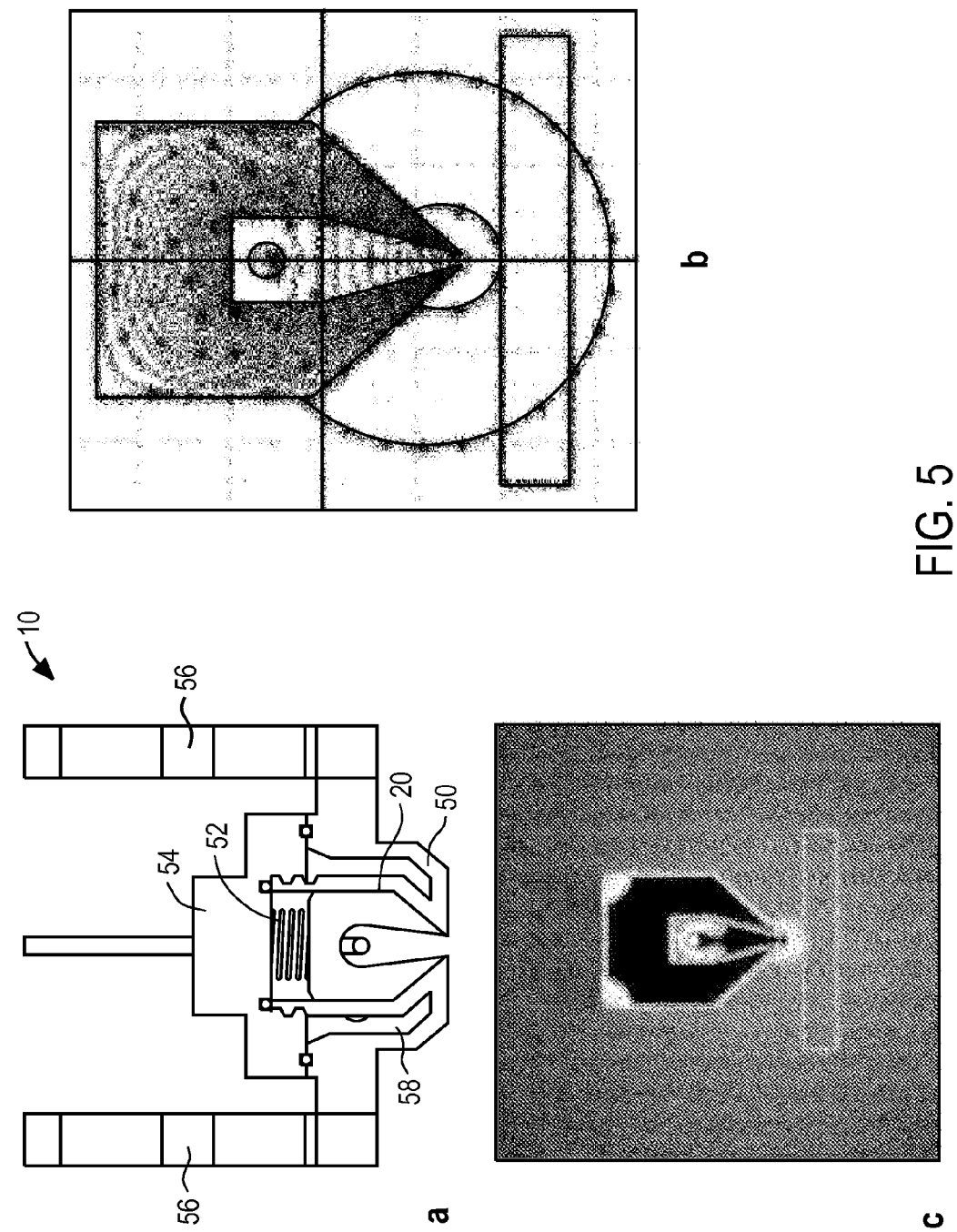
FIG. 5a is a cross-sectional side view of the assembly of FIG. 4.
FIG. 5b is a cross-sectional side view illustrating magnetic flux that is created within and around a flux concentrator of the assembly.
FIG. 5c is a cross-sectional side view of the flux concentrator illustrating magnetic field strength.

FIG. 5a shows a cross-sectional view of the apparatus 10, detailing the position of the flux concentrator 20. As illustrated in FIGS. 5b and 5c, two-dimensional magnetic field calculations show that this flux concentrator geometry maximizes the magnetic field strength at the powder bed surface.

Figure 6:
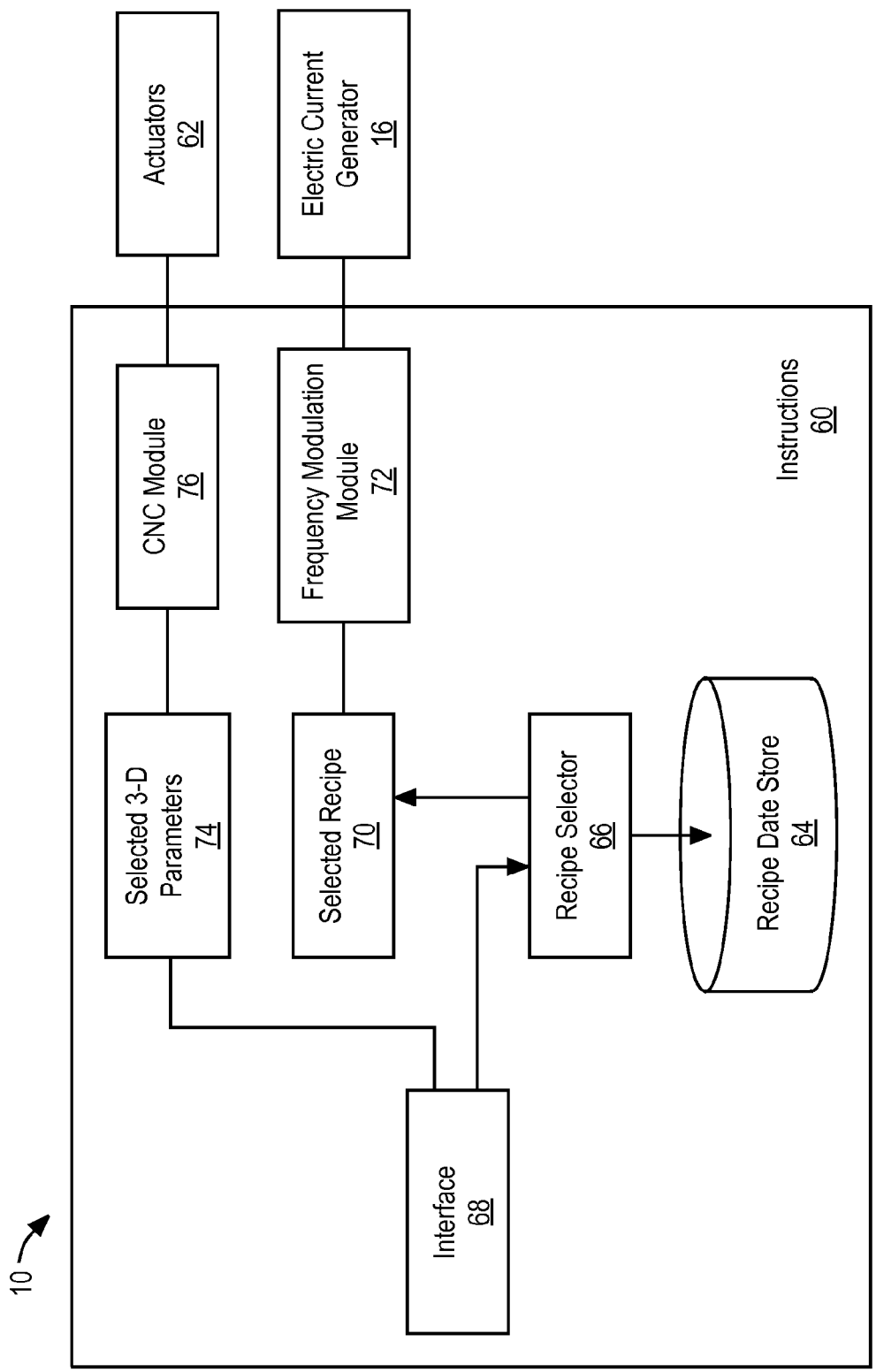
FIG. 6 is block diagram illustrating instructions forming part of the apparatus of FIG. 3.

FIG. 6 illustrates further components of the apparatus 10 shown in FIG. 3, including instructions 60 that are executable by a processor of a computer, actuators 62 to cause movement in x,y and z directions of the flux concentrator 20 relative to the particles 32, and the electric current generator 16.

The instructions 60 include a recipe data store 64, a recipe selector 66, an interface 68, a selected recipe 70, a frequency modulation module 72, selected 3D parameters 74, and a CNC module 76.

In use, an operator can view the interface 68 on a display device. The interface 68 gives the operator access to the recipe selector 66 and the selected 3D parameters 74. The recipe selector 66 includes inputs for materials and particle sizes. A plurality of recipes are stored in the recipe data store 64. The recipe selector 66 selects one of the recipes in the recipe data store 64 based on the input provided by the operator through the interface 68. The recipe that is selected by the recipe selector 66 is then stored as the selected recipe 70.

The operator also enters 3D parameters through the interface 68, for example the manufacture of a cylinder as hereinbefore described. The parameters that are entered by the operator are then stored as the selected 3D parameters 74. The frequency modulation module 72 then utilizes the parameters of the selected recipe 70, including frequency, to modulate a frequency generated by the electric current generator 16. The CNC module 76 simultaneously operates the actuators 62 to create a desired two-dimensional, and ultimately three-dimensional part.

Figure 7:
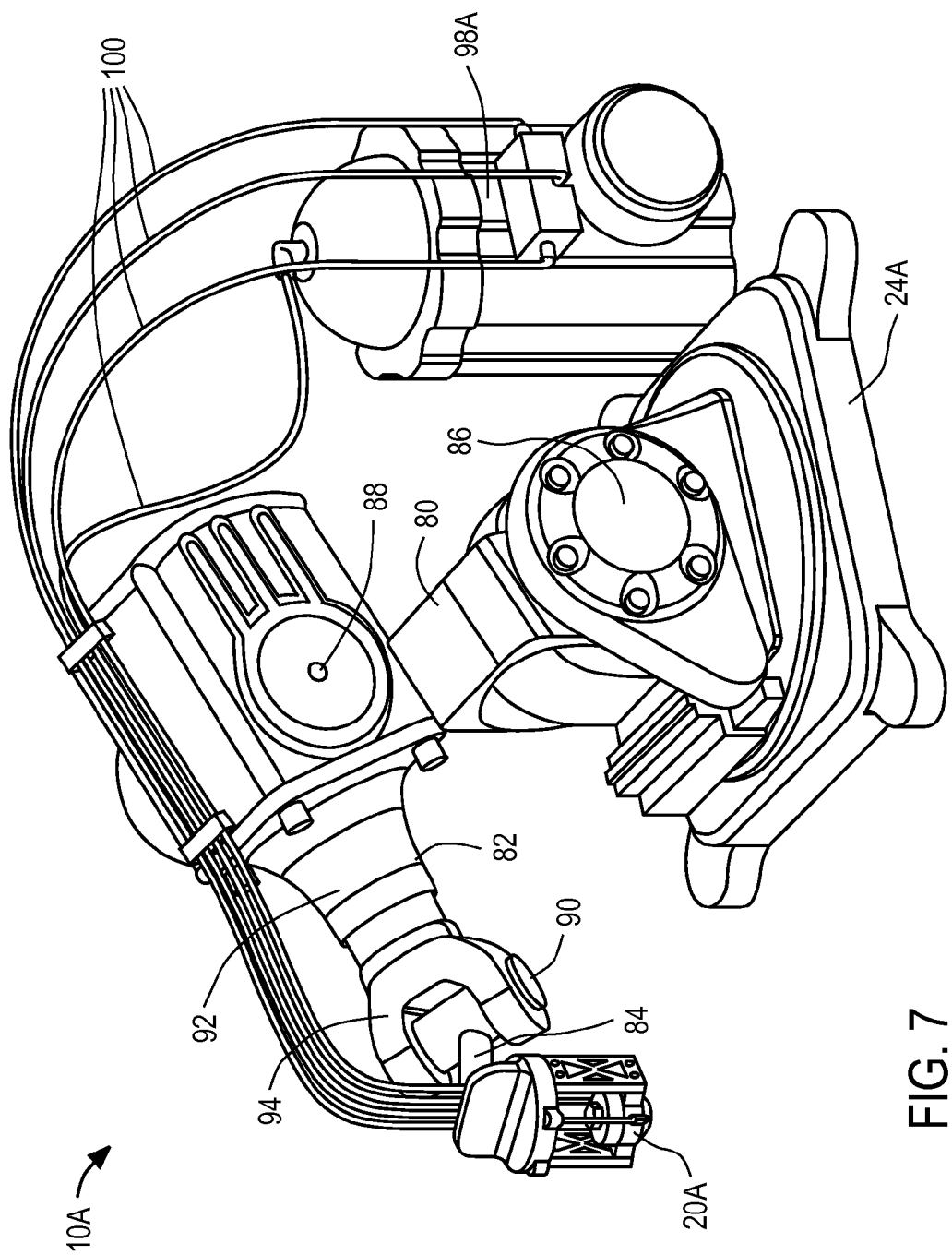
FIG. 7 is a perspective view of a sintering apparatus according to an alternate embodiment of the invention.

FIG. 7 illustrates an apparatus 10A according to another embodiment of the invention wherein like reference numerals indicate like or similar components as the apparatus 10 in FIG. 3. In this apparatus, however, the particles are fluidized in the container 98 and entrained in the gas connections 100 that connect to the flux concentrator 20A. This system may be located in a controlled atmosphere, or may be equipped with a gas shielding system to prevent unwanted oxidation of the powder during the deposition. The apparatus 10A includes a frame 24A, first, second and third components 80, 82 and 84, first, second and third pivot pins 86, 88 and 90 respectively. The first component 80 is mounted to the first pivot pin 86 so as to pivot relative to the frame 24A about a horizontal axis. The second component 82 is mounted to the second pivot pin 88 so as to pivot relative to the first component 80 about a horizontal axis parallel to the horizontal axis that is provided by the first pivot pin 86. The third component 84 is mounted to the second component 82 on the third pivot pin 90. The third pivot pin 90 provides an axis at right angles to a direction in which the second component 82 extends. The second component 82 has first and second pieces 92 and 94. The second piece 94 is rotatable relative to the first piece 92 about a common axis in which the second component 82 extends. The flux concentrator 20A is mounted to the third component 84. The apparatus 10A thus provides for three-dimensional movement of the flux concentrator 20A.

Figure 8A:
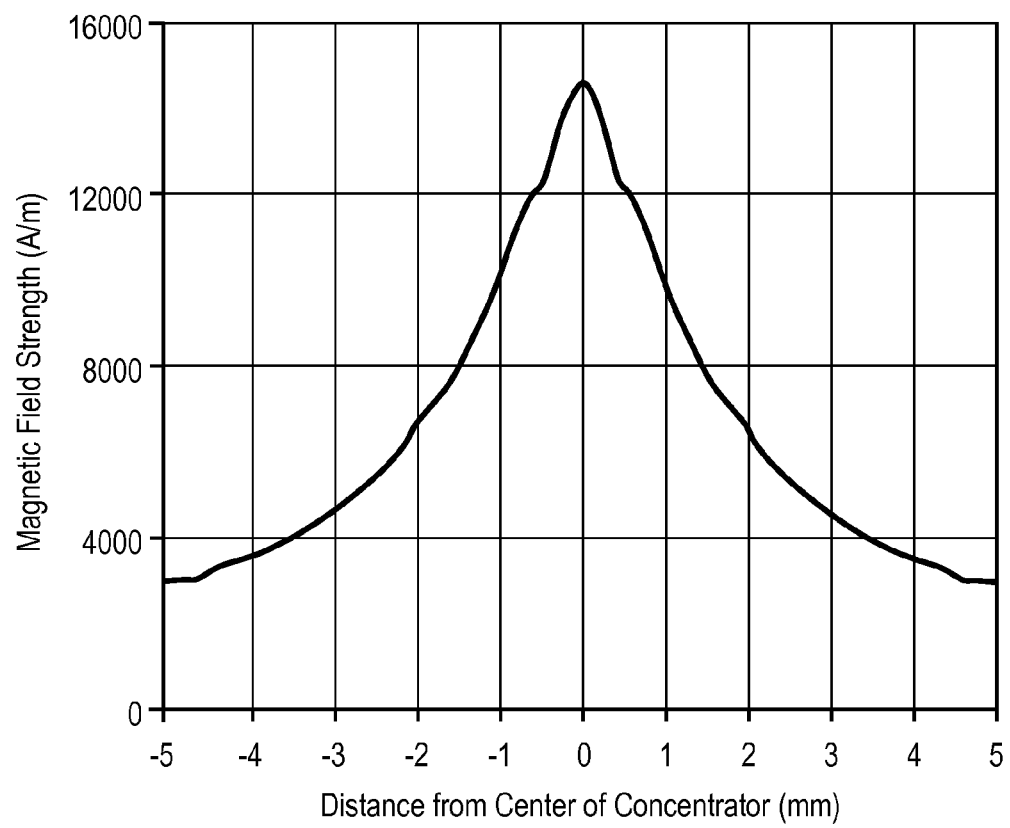
FIG. 8a is a graph of calculated peak magnetic field strength.
Figure 8B:
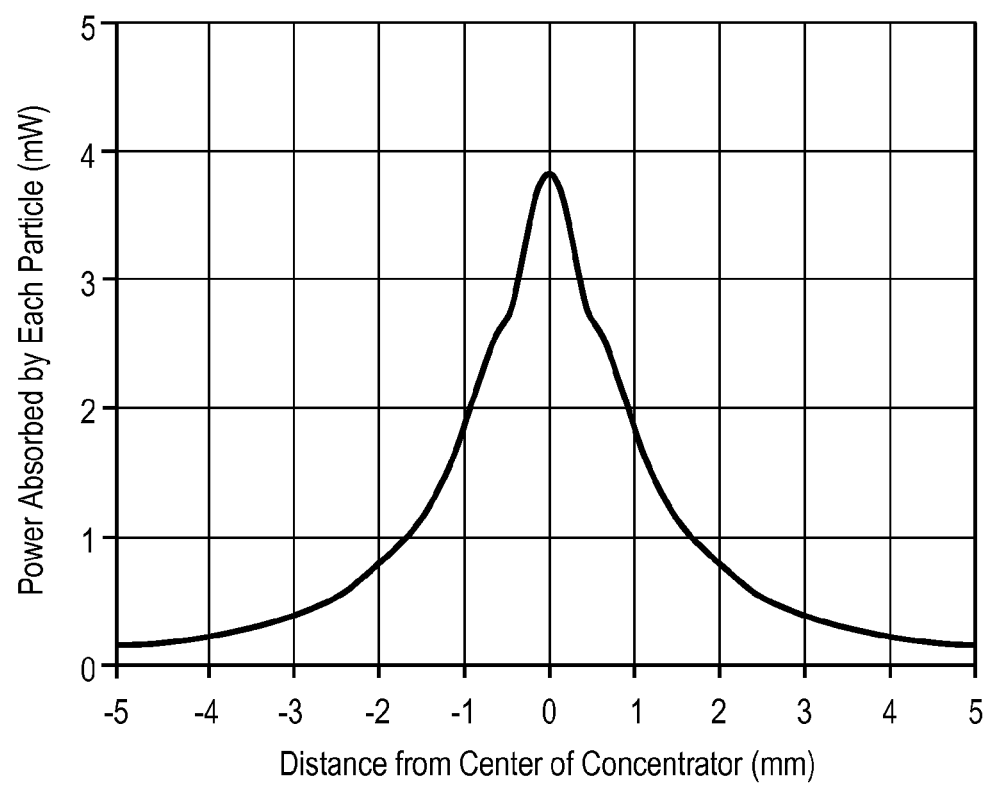
FIG. 8b is a graph of power absorbed by aluminum powder as a function of distance from a center of the flux concentrator.

Preliminary calculations based on two-dimensional magnetic field strength models indicate that appropriately sized metallic powders will quickly reach sintering temperatures using the MIS transducer shown schematically in FIGS. 4a, 4b, 5a, 5b and 5c. Consider a layer of aluminum powder with 100 μm particle size approximately 1 mm below a flux concentrator that is energized with a 3 MHz, 70 $A_{rms}$ current. The calculated peak magnetic field strength (A/m) at the powder bed is shown in FIG. 8a. The flux concentrator in this model has a gap at the tip of 0.5 mm and the magnetic field strength is strongly peaked near the center of the flux concentrator. Note that the peak flux density (B) at the powder bed is approximately 18 milliTesla. Because the powder bed is loosely packed, individual aluminum particles in the powder bed will have poor thermal conductivity to adjacent particles. Thus, each particle can be treated adiabatically and the power absorbed by each particle can be estimated using Equation [2]. FIG. 8b shows the power absorbed by the aluminum powder bed versus distance from the center of the flux concentrator. Because the absorbed power scales as the square of the field strength, the spatial distribution of the absorbed power is smaller than the field strength distribution.

Figure 9:
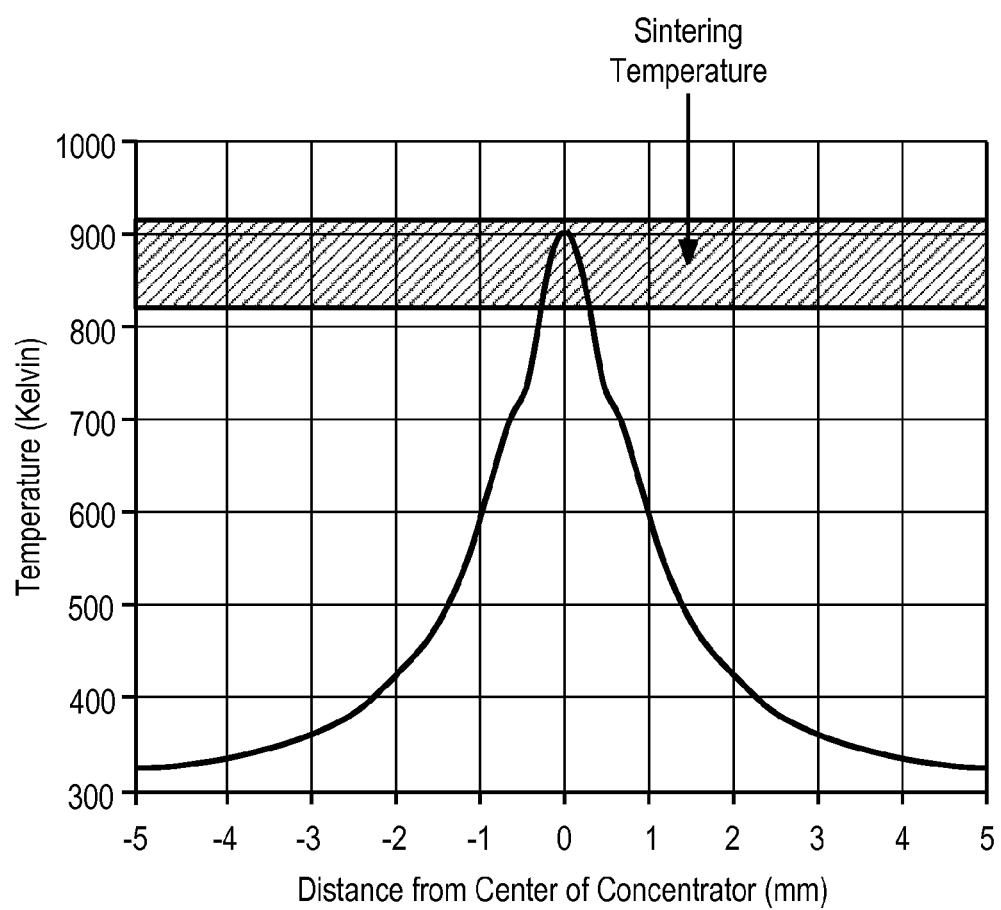
FIG. 9 is a graph illustrating temperature distribution as a function of the distance from the center of the flux concentrator.

FIG. 9 shows the temperature distribution of a 100 μm aluminum particle bed assuming the particles heat adiabatically during a 200 ms exposure to the 3 MHz magnetic field positioned 1 mm away from the flux concentrator. There is a sharp rise in temperature of the powder bed near the center of the flux concentrator. Sintering of aluminum powder occurs for temperatures above approximately 90% of the material's melting temperature in Kelvin. These calculations strongly suggest that high frequency micro-scale induction heating may be used to sinter metal powders with high spatial resolution as a means to consolidate material in an additive manufacturing process.

Micro-Induction Sintering of Metallic and Metal Matrix Composite Powders

With a given set of material properties (e.g. resistivity, magnetic permeability, particle dimensions), the frequency of the induction heating process is an important factor in the amount of power absorbed by the powder. This is particularly critical as the particle dimensions decrease in size such as those encountered in the induction heating of micron-sized metallic powders.

Micro-Induction Sintering of Metal Powders

The ability to produce high-strength metal parts directly from powdered metals is valuable from an industrial perspective as it reduces the time it takes to bring products to market. From a military perspective, this rapid manufacturing capability is an important means to quickly repair or fabricate replacement part s for critical applications. A number of homogeneous metallic materials have been successfully incorporated in state-of-the-art additive manufacturing processes (e.g. Aluminum, Titanium, Copper, Stainless Steels). The MIS additive manufacturing method is unique in that the heating efficiency depends critically on the properties and morphology of the metal powder. Precise control over these parameters may result in improved fabricating times and part performance.

Figure 10:
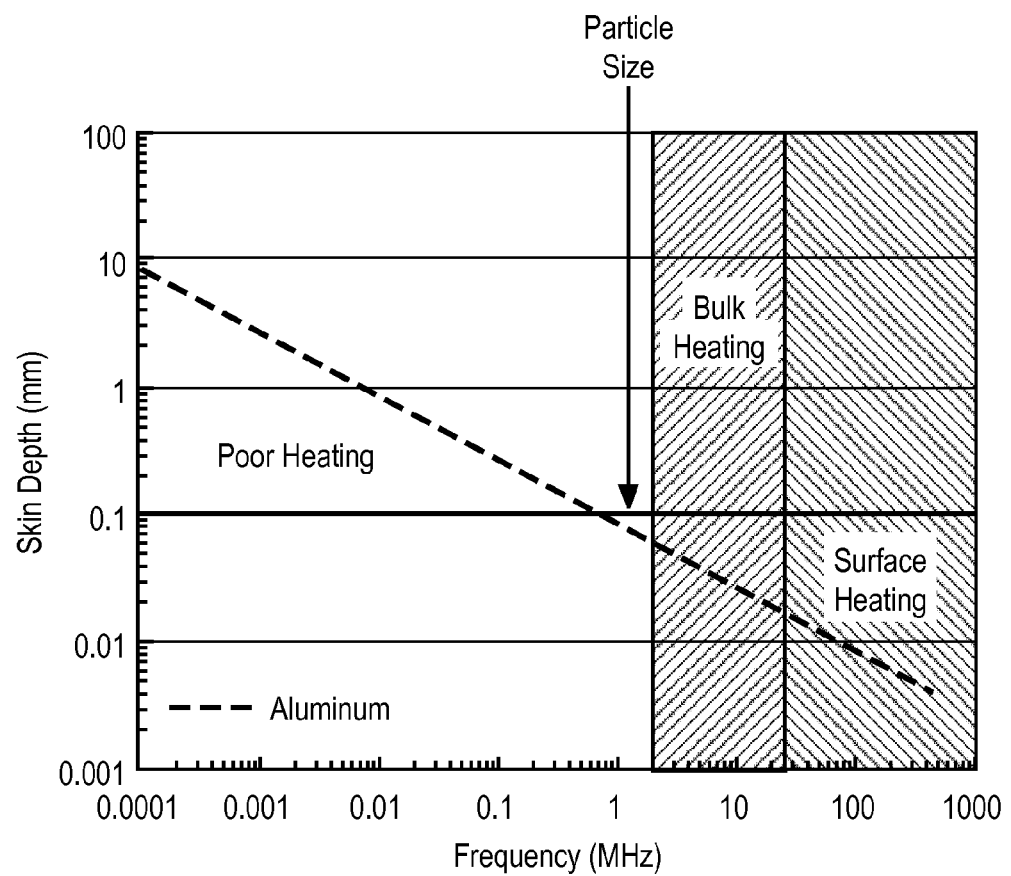
FIG. 10 is a graph illustrating variation of skin depth with frequency for aluminum.

Consider again a loosely packed bed of non-magnetic aluminum particles with an average diameter of approximately 100 μm. FIG. 10 shows the variation of skin depth with frequency calculated using the materials properties of aluminum. Effective heating of the particles occurs with particle dimensions of approximately 2δ, which means that the induction frequency must be greater than approximately 2 MHz for sufficient power to be absorbed by the particles to achieve sintering temperatures.

Unlike laser-based consolidation methods where a high intensity laser indiscriminately heats the metal powder within the beam width, the spatially compact high frequency magnetic field in MIS technology causes local heating of individual metal particles in a loosely packed bed. The thermal conductivity between the particles is very low, and thus the individual particles are heated in near adiabatic conditions by the alternating magnetic field. This local heat causes melting and liquid phase binding occurs in the powder bed. During the sintering process, however, the increased grain size may result in a transition from bulk induction heating (i.e. δ~grain size) to surface inductive heating (i.e. δ<<grain size) as shown schematically in FIGS. 2a, 2b and 2c. This results in a de-coupling of the high frequency magnetic field to the sintered material, which reduces the degree of volumetric heating: a feature unique to the MIS approach.

MIS of Metal Matrix Composite Powders

Ceramic metal matrix composites present unique challenges to additive machining technologies. In general, material consolidation occurs through the sintering of a metallic binder that is wetted to the ceramic. In both SLS and DMD technologies, the entire composite (i.e. ceramic and binder) is heated by the laser, which in some cases may lead to the thermal decomposition of the ceramic part.

In the MIS system according to the invention, the high frequency induction of eddy currents in metal matrix composites allows for the selective heating and consolidation of specific materials within the same metal matrix powder. This is especially advantageous in the consolidation of ceramic/metal matrix composites such as WC/Co for machine tools and ammunition, and SiC/Al for high thermal load electronic packaging applications and the fabrication of parts with high strength and stiffness. In these composites, MIS allows for selective heating of the metallic binder in these composite materials through differences in resistivity, relative permeability, or domain size.

Figure 11A:
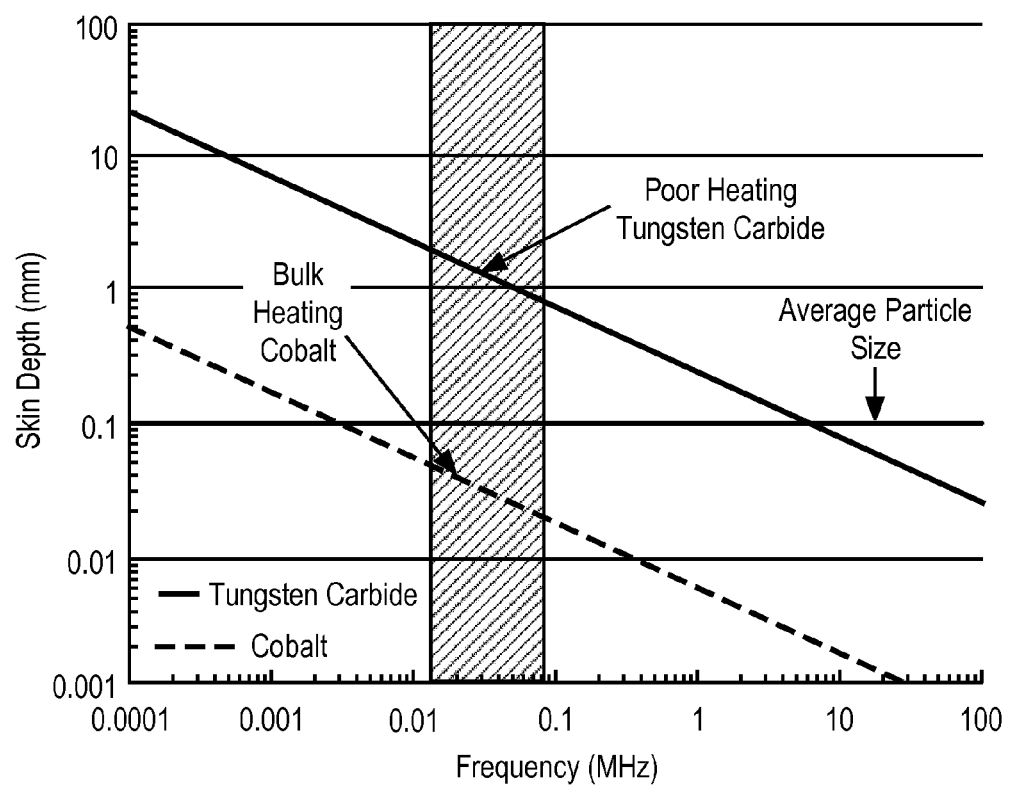
FIG. 11a is a graph of skin depth against frequency for a composite material.
Figure 11B:
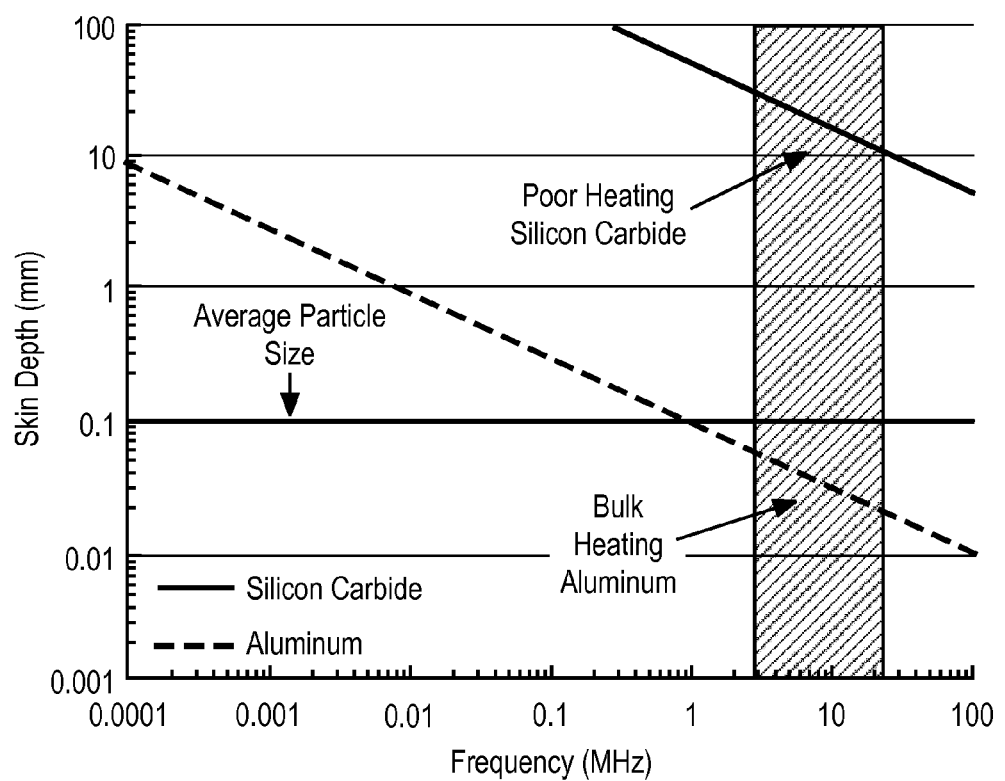
FIG. 11b is a graph of skin depth against frequency for a particle having an aluminum binder.

Consider a WC/Co metal matrix composite material with average component domain sizes of 100 μm. FIG. 11a shows the skin depth vs. frequency for this composite material based on the physical parameters listed in Table 1. It is seen that there is a large difference in skin depth between these two materials resulting primarily from the large relative permeability of cobalt. These data suggest that the cobalt binder in WC/Co composites may be selectively sintered by micro-induction heating at approximately 0.01 MHz. At this frequency, the skin depth of WC is much larger than the particle size, which leads to poor power absorption as discussed previously. Similarly, the aluminum binder in SiC/Al composites with 100 μm domain size, shown in FIG. 11b, can be selectively sintered by micro-induction heating at approximately 3 MHz. This may allow for the rapid sintering of SiC/Al composites without the associated disintegration of SiC encountered in laser sintering of these composite materials.

TABLE 1

| Material | Resistivity (Ohm m) | Relative Permeability ($\mu_r$) |
| --- | --- | --- |
| Tungsten Carbide | $2.0 \times 10^{-7}$ | 1 |
| Cobalt | $6.2 \times 10^{-8}$ | 600 |
| Silicon Carbide | $10 \times 10^{-2}$ | 1 |
| Aluminum | $2.7 \times 10^{-7}$ | 1 |

MIS of Superconductor and Superconductor Metal Matrix Composite Powders

MIS is suitable for the manufacture of superconducting parts for high power applications using superconductor and superconductor metal matrix composites. Fine powders of these materials are prepared under stringent inert atmosphere conditions and formed into component parts using both standard isostatic press methods and laser-based sintering technologies. MIS technology allows for rapid manufacturing of Niobium parts used for high-Q resonant cavities and waveguides, and for the selective sintering of the binder metal in Superconducting Nanocomposite (ScNc) materials such as Magnesium Diboride/Metal (e.g. Ga, Sn, In, Pb, Bi, or alloys) nanocomposites for use in superconducting utility-scale generators and fault current limiters.

Figure 12A:
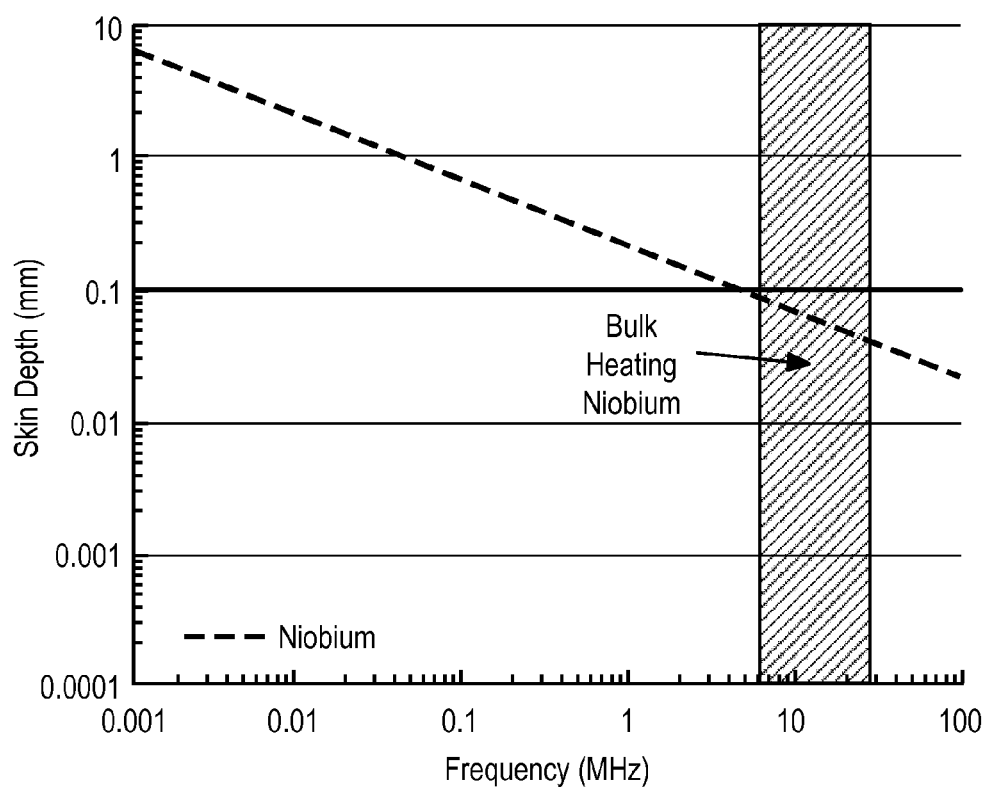
FIG. 12a is a graph of skin depth against frequency for a particle that includes Niobium.

Consider a Niobium powder with an average particle size of 100 μm. FIG. 12a shows the calculated skin depth versus frequency for this material. Because of the relatively small specific heat and high resistivity of Niobium, preliminary calculations indicate that volumetric heating and subsequent powder sintering can be achieved in the MIS system with a peak magnetic field strength of approximately 12 kA/m (~15 milliTesla at sample) at 16 MHz. As Niobium is a refractory metal, the MIS additive manufacturing process must be carried out in an inert (e.g. Argon) atmosphere or vacuum.

In the additive manufacturing of ScNc materials, heating selectivity within the composite is of primary importance if the superconducting properties of one of the constituent materials degrades with extreme temperature. A specific case of technical importance is the additive manufacturing of $MgB_2$/Ga composites, where Gallium is the low temperature binder material with a melting point of approximately 30° C. Laser-based additive machining processes, with indiscriminant heating of both $MgB_2$ and the binder, result in the loss of Mg from the superconducting material with the associated degradation of superconducting properties even at low laser power levels.

Figure 12B:
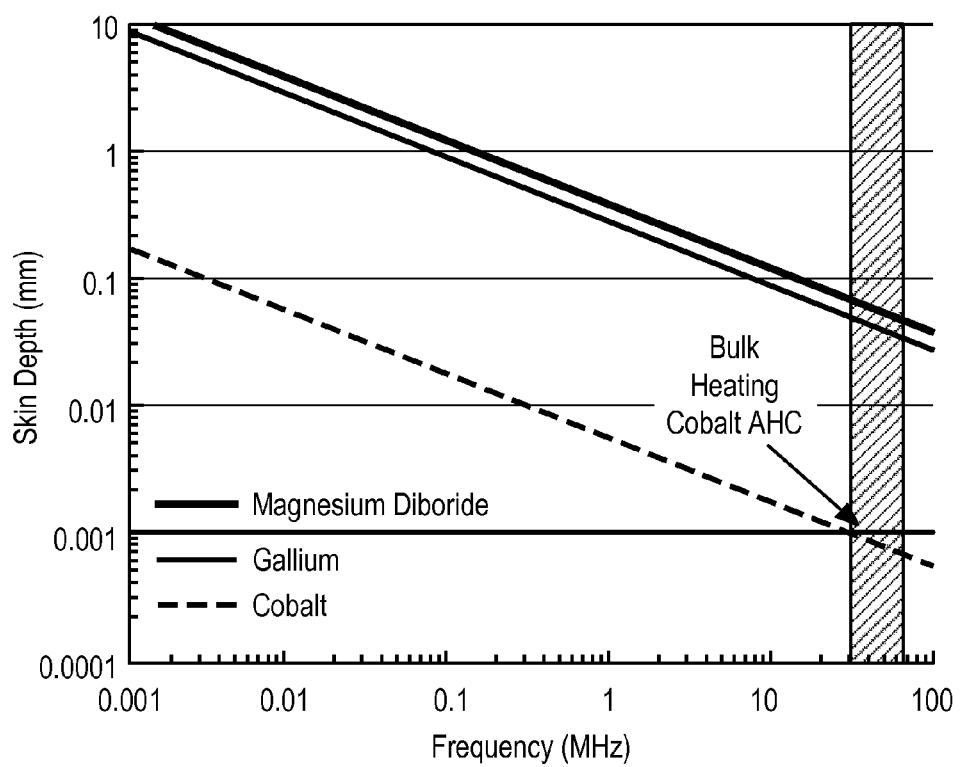
FIG. 12b is a graph of skin depth against frequency for a composite incorporating artificial heating centers.

In principle, the MIS process should allow for the direct heating and sintering of Gallium, while only heating $MgB_2$ indirectly. In practice, however, ScNc materials possess superior superconducting properties with very small (i.e. less than 1 μm) average domain size in the composite material. As shown in FIG. 12b, the skin depth of both $MgB_2$ and Gallium is well over 1 μm at 100 MHz and little power will be absorbed in the composite material. MIS is suitable for selective heating in small domain metal matrix composites by incorporating artificial heating centers (AHCs) in the binder metal during the additive manufacturing process. An AHC is a material that is designed to be susceptible to volumetric heating in the MIS process. Examples of effective AHCs include metals with high relative permeability (e.g. Cobalt, Nickel, Iron, etc.), or materials that absorb energy from the magnetic field through hysteresis (e.g. Ferrites, carbon nanotubes, etc.). The energy absorbed by the AHC during the MIS process is a function of the materials properties of the AHC and the domain size, both of which can be engineered. In addition, the presence of the AHC in the metal matrix composite should not compromise the required physical and electronic characteristics of the composite material. Referring again to FIG. 12b, consider the addition of 2% by volume Cobalt particles, with an average particle size of 1 μm, to $MgB_2$/Ga ScNc material. Preliminary calculations indicate that the Cobalt particles experience volumetric heating with the application of a spatially compact 30 MHz alternating magnetic field, which then indirectly heats the Gallium binder. The low sintering temperatures in this process minimize, or eliminate any possible Ga—Co alloy formation and protect the superconducting properties of the $MgB_2$.

Variable Frequency Micro-Induction Sintering of Metal Powders

Figure 13:
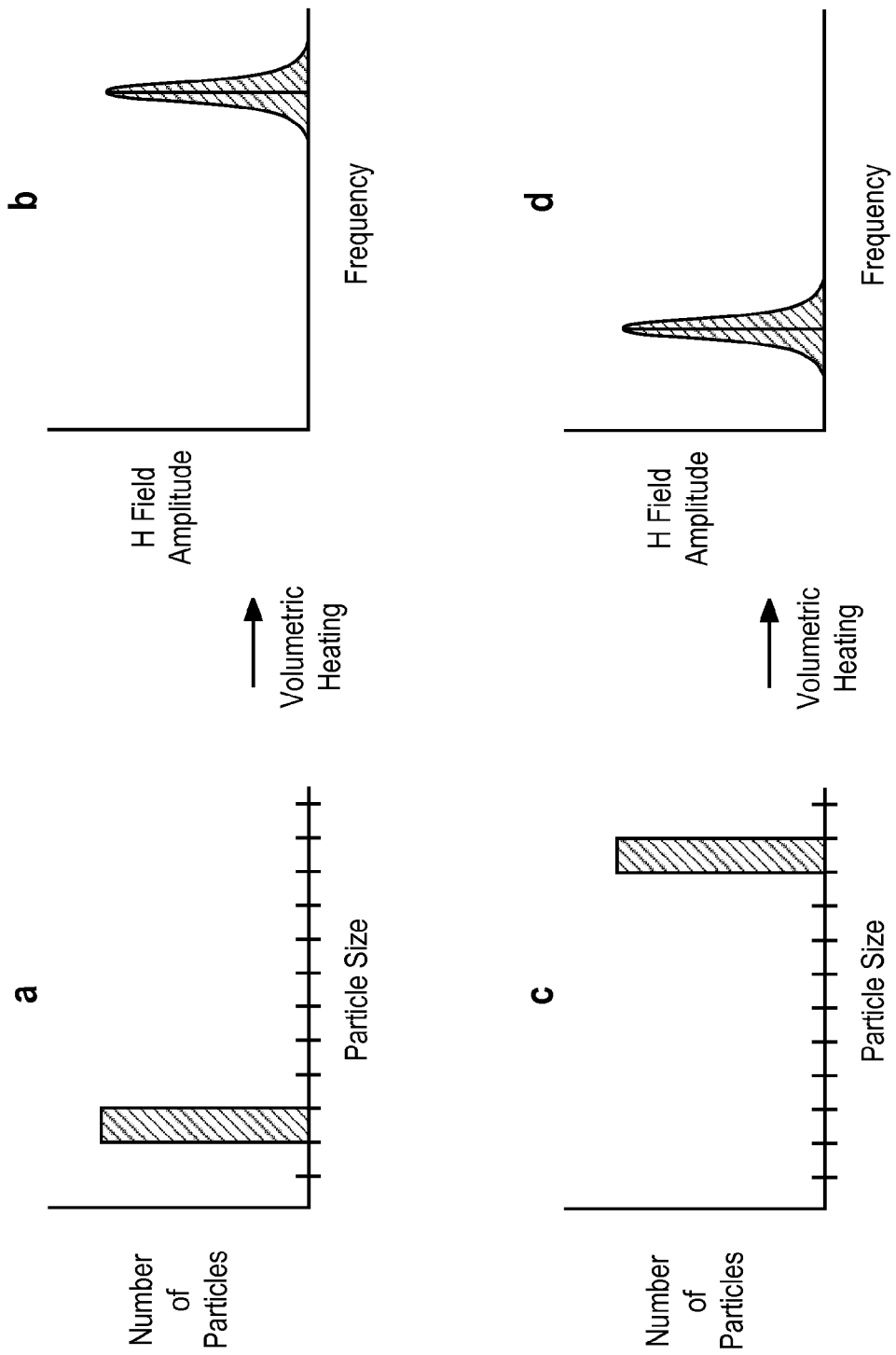

In general, powders consist of or particles with a variety of different sizes. Mono-disperse homogenous powders may have a majority of particles at a given size, 100 μm for example, with a distribution of sizes around this average. The particle size distribution of other powders may be bimodal, or even more complicated if the powder consists of a combination of two or more powders. At a given frequency, the MIS method will effectively couple to particles of a given size in the powder. As described previously, particles that are smaller or larger will not couple as efficiently to the alternating magnetic field and thus will not consolidate well. FIG. 13a shows the particle size distribution of a mono-disperse powder. This powder can be heated volumetrically by exposing the powder to a relatively narrow bandwidth high frequency magnetic field tuned to such a frequency that the skin depth of the material is on the order of the particle size, as shown schematically in FIG. 13b. Correspondingly, a larger size mono-disperse powder can be heated volumetrically with a lower frequency, narrow bandwidth magnetic field, as shown schematically in FIGS. 13c and d.

Figure 14:
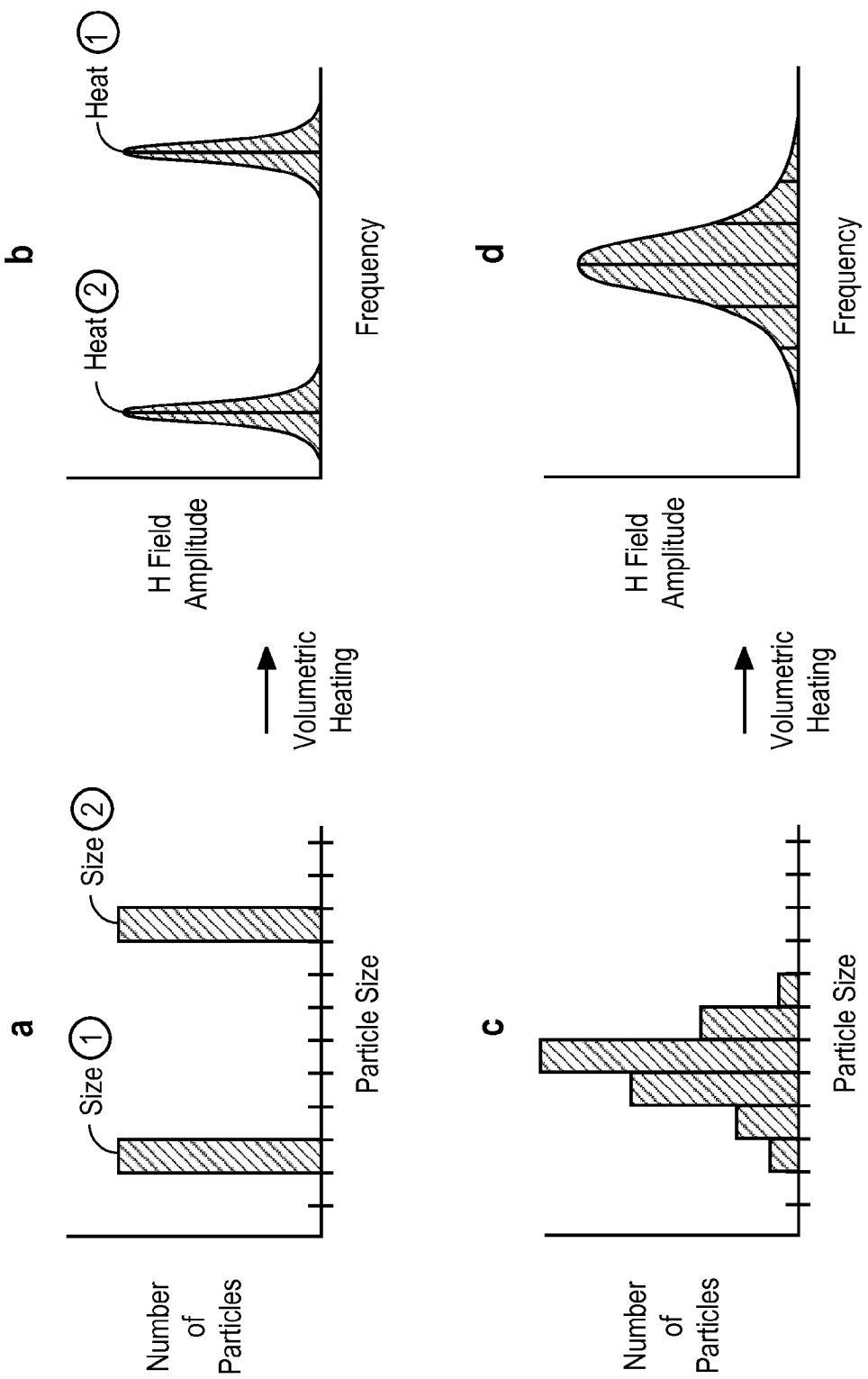

By changing the frequency spectrum of the electric signal that creates the alternating magnetic field, it is possible to more effectively heat powders that consist of a variety of particle sizes. FIG. 14a shows the bimodal particle size distribution of a powder. This powder can be heated volumetrically by exposing the powder to an alternating magnetic field with a bimodal frequency spectrum as shown schematically in FIG. 14b. In this example, the higher frequency magnetic field is used to volumetrically heat the smaller particles and the lower frequency magnetic field is used to volumetrically heat the larger particles. While this example illustrates selective volumetric heating of particles, analogous adjustments of the frequency spectrum of the magnetic field can be used to selectively heat the surface of the particles or to not heat at all. In a typical powder, the particle size distribution is not mono-disperse, but rather has a wide often asymmetric distribution as shown schematically in FIG. 14c. Here again, by adjusting the frequency spectrum of the alternating magnetic field, it is possible to effectively heat the entire particle size distribution with the frequency spectrum shown schematically in FIG. 14D.

Figure 15:
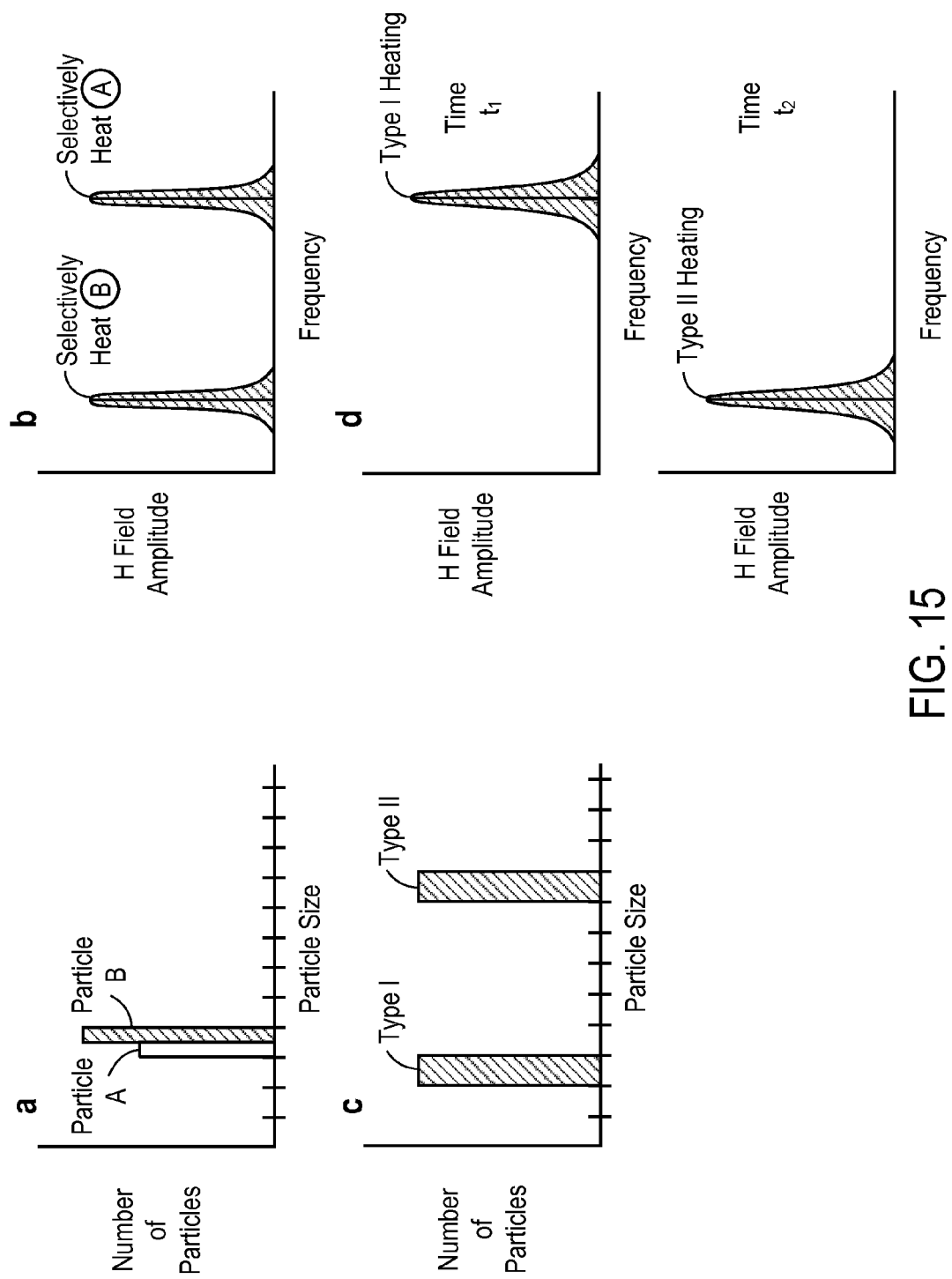

In inhomogeneous mixtures, such as a mixture of particles A and B with differing physical characteristics, it is possible to selectively heat A or B independently, simultaneously, or with a time-varying dependence simply by changing the frequency and amplitude of the driving electrical signal. FIG. 15a shows a mono-disperse particle size distribution consisting of two distinct particle types, A and B. Even though these particles possess similar particle sizes, it is possible to selectively heat particle A or B if they possess significantly different physical properties (e.g. permeability, resistivity). This is shown schematically in FIG. 15b. In FIG. 15c, a powder with a bimodal particle size (Type I particle and Type II particle) distribution is shown schematically. The MIS technique also allows for the time dependent selective heating of powders by changing the frequency spectrum of the alternating magnetic field with time. This is shown schematically in FIG. 15D where for time t1 the Type I particle is volumetrically heated and at time t2 the Type II particle is volumetrically heated. This unique property of the MIS method allows for the very tight coupling of the characteristics of the high frequency magnetic field to the specific properties of the powder to be consolidated.

Figure 16A:
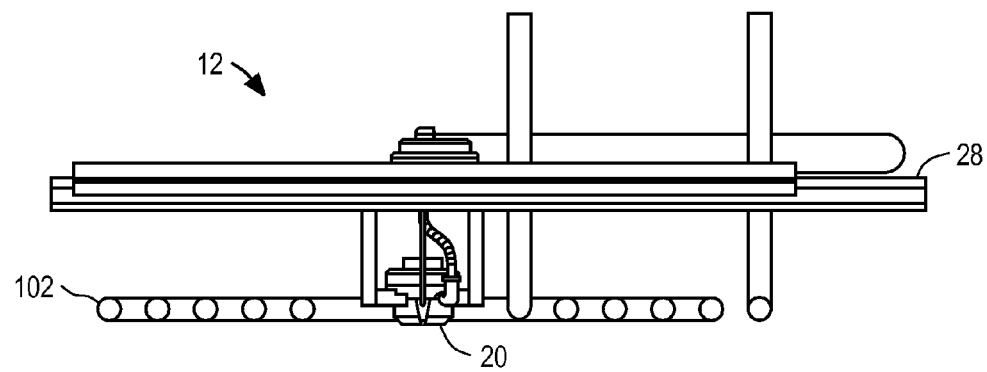
FIG. 16a is a partially cross-sectioned side view of a sintering apparatus according to a further embodiment of the invention.
Figure 16B:
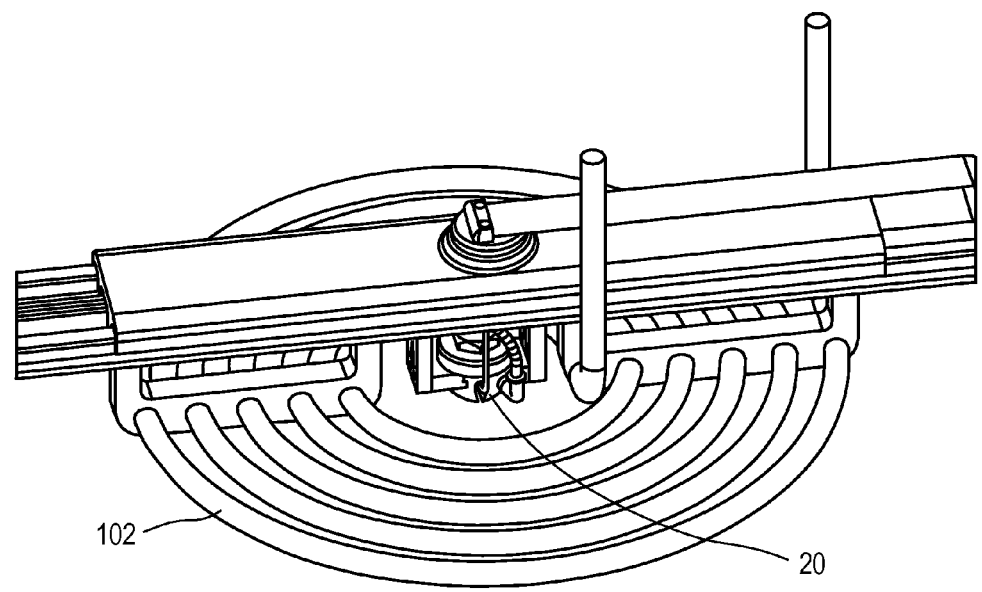

Low Frequency Heating of Macroscopic Parts During the Micro-Induction Sintering of Metal Powders Another embodiment of the invention is shown in FIGS. 16a and b where a localized heater in the form of the high frequency flux concentrator 20 is in the middle of bulk heater in the form of a larger, low frequency induction coil 102. The low frequency coil 102 is used to heat the consolidated part in preparation for the sintering of the powder by the high frequency flux concentrator that when the particles sinter into a larger unit, the increased domain size leads to inefficient surface heating. The high frequency of the flux concentrator is not ideal for bulk heating. The low frequency, spatially disperse flux concentrator (i.e. the induction coil) can be used to heat the macroscopic part, reduce thermal and mechanical stress, and reduce the amount of power required for the initial powder consolidation.

The low frequency coil 102 is driven by its own electric current generator (not shown) and exposes the part to an alternating magnetic field generated by the alternating electric current. The high frequency flux concentrator 20 heats only a portion of the particles that are in contact with the part so that the particles of the portion join with the part. The alternating electric current for pre-heating the part is a low frequency alternating electric current that exposes the part to a low frequency alternating magnetic field. The alternating current for heating the particles is a high frequency alternating electric current that exposes a portion of the particles that are in contact with the part to a high frequency alternating magnetic field.

Figure 17A:
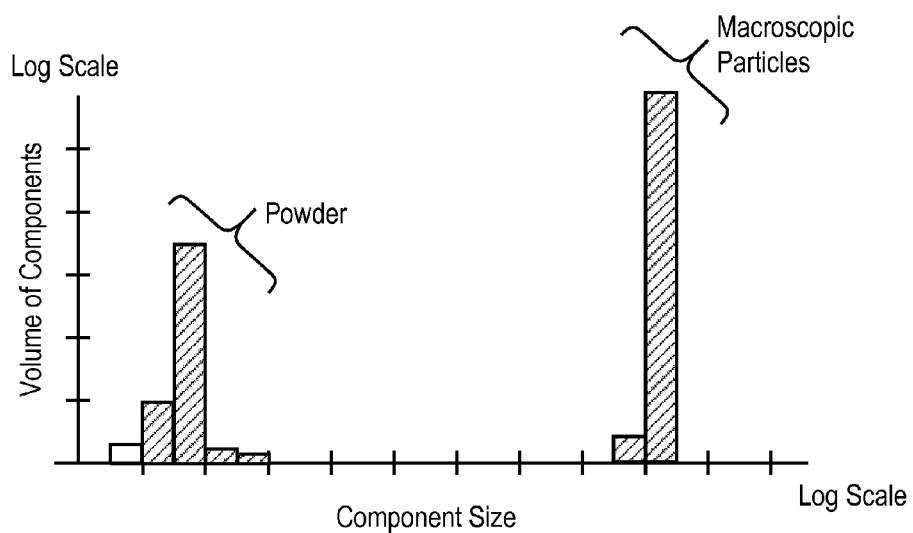
FIG. 17a illustrates the size of a macroscopic part and powder particles of the macroscopic part, respectively.
Figure 17B:
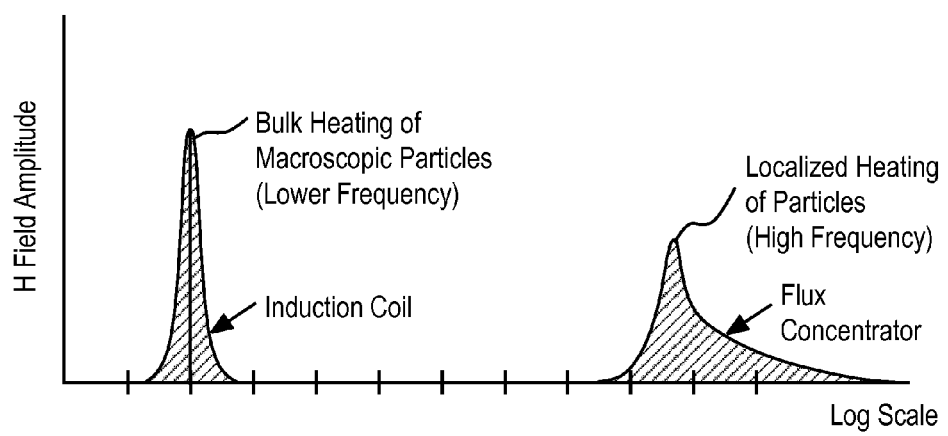
FIG. 17b illustrates the frequencies used by the apparatus in FIGS. 16a and b for heating the macroscopic part and sintering the powder.

FIG. 17a shows the component size distribution of a powder and macroscopic part typically encountered during the additive manufacturing process. The component size distribution consists of small particles that comprise the powder being consolidated, and the macroscopic solid part that is formed through the consolidation of the powder. As before, the powder can be heated volumetrically by exposing the powder to an alternating magnetic field with a specific frequency spectrum chosen to efficiently heat and consolidate the powder. Upon consolidation, the macroscopic part no longer couples well to the high frequency alternating magnetic field and does not heat well. The low frequency induction coil, however, can be tuned to a frequency that couples well with the macroscopic part, as shown in FIG. 17b. This frequency will always be less than the high frequency alternating magnetic field employed to consolidate the powder. Here, for example, as the flux concentrator moves across the powder bed, the low frequency induction coil is used to preheat the macroscopic part before, during, and after powder consolidation by the flux concentrator. Preheating of the macroscopic part during the additive manufacturing process reduces the thermal and mechanical strain in the macroscopic part and reduces the energy input required by the high frequency flux concentrator to consolidate the powder.

This low frequency, spatially disperse flux concentrator can also be used in SLS, DMD or Electron Beam Melting systems to pre-heat the additively manufactured part for subsequent sintering of the powder.

Computer System

Figure 18:
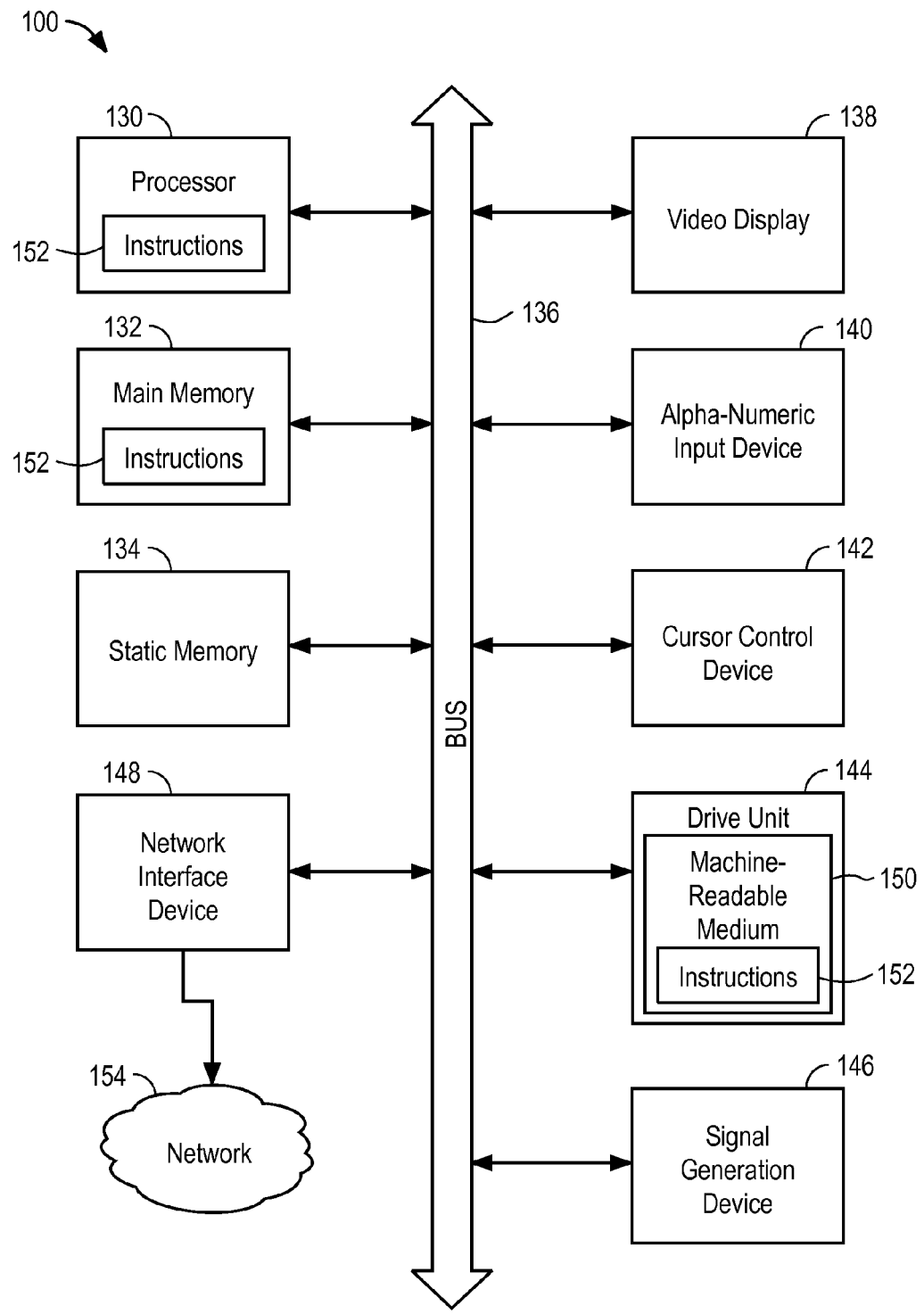
FIG. 18 is a block diagram of a machine in the form of a computer system.

FIG. 18 shows a diagrammatic representation of a machine in the exemplary form of a computer system 100 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 100 includes a processor 130 (e.g., a central processing unit (CPU), a graphics processing unit (GPU), or both), a main memory 132 (e.g., read-only memory (ROM), flash memory, dynamic random access memory (DRAM) such as synchronous DRAM (SDRAM) or Rambus DRAM (RDRAM), etc.), and a static memory 134 (e.g., flash memory, static random access memory (SRAM, etc.), which communicate with each other via a bus 136.

The computer system 100 may further include a video display 138 (e.g., a liquid crystal display (LCD) or a cathode ray tube (CRT)). The computer system 100 also includes an alpha-numeric input device 140 (e.g., a keyboard), a cursor control device 142 (e.g., a mouse), a disk drive unit 144, a signal generation device 146 (e.g., a speaker), and a network interface device 148.

The disk drive unit 144 includes a machine-readable medium 150 on which is stored one or more sets of instructions 152 (e.g., software) embodying any one or more of the methodologies or functions described herein. The software may also reside, completely or at least partially, within the main memory 132 and/or within the processor 130 during execution thereof by the computer system 100, the memory 132 and the processor 130 also constituting machine readable media. The software may further be transmitted or received over a network 154 via the network interface device 148.

While the instructions 152 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art. The embodiments describe a flux concentrator that is made of a solid metal or alloy, although it should be understood that a flux concentrator in the form of a solenoid may be suitable for certain applications.

What is claimed:

1. A method of sintering small particles, comprising:
holding the particles in contact with one another;
generating an alternating electric current; and
exposing the particles to an alternating magnetic field generated by the alternating electric current so that they heat and join, wherein each particle has a cross-dimension that is more than $2\delta$ and $\delta$ is defined as $$\delta = \sqrt{\frac{\rho}{\pi f \mu}}$$

wherein $\rho$ is the resistivity of the material of the particle, f is the frequency of the alternating magnetic field, and $\mu$ is the magnetic permeability of the material of the particle.

2. The method of claim 1, further comprising:
exposing a collector of a flux concentrator to the alternating magnetic field generated by the alternating electric current; and
focusing the alternating magnetic field with a tip of the flux concentrator so that the particles are exposed to the alternating magnetic field.

3. The method of claim 1, wherein the particles are small particles, further comprising:
holding the small particles and a part in contact with one another;
pre-heating the part by generating an alternating electric current and exposing the part to an alternating magnetic field generated by the alternating electric current; and
heating only a portion of the particles that are in contact with the part with the alternating magnetic field so that the particles of the portion join with the part.

4. The method of claim 1, wherein the alternating magnetic field has a frequency of at least 100 kHz.

5. The method of claim 3, wherein the frequency is at least 2 MHz.

6. The method of claim 1, wherein the particles are exposed to two different frequencies that cause joining of two different parts, respectively, of the particles.

7. The method of claim 6, wherein a high-frequency heats a part of the particles with smaller particles and a low frequency heats a part of the particles with larger particles.

8. The method of claim 7, wherein the two frequencies occur simultaneously.

9. The method of claim 6, wherein the two frequencies occur at different times to heat parts of the particles having different types of particles, respectively.

10. The method of claim 1, wherein surfaces of the particles heat to above 90% of a melting temperature of the particles in Kelvin.

11. The method of claim 1, wherein the particles include ceramic material.

12. The method of claim 1, wherein the particles include superconductor material.

13. A method of sintering, comprising:
holding small particles and a part in contact with one another;
pre-heating the part by generating an alternating electric current with a first heating device and exposing the part to an alternating magnetic field generated by the alternating electric current; and
heating only a portion of the particles that are in contact with the part with a second device so that the particles of the portion join with the part.

14. The method of claim 13 wherein the alternating electric current for pre-heating the part is a low frequency alternating electric current and the particles are heated by:
generating a high frequency alternating electric current; and exposing the particles to an alternating magnetic field generated by the high frequency alternating electric current.

15. A method of sintering small particles, comprising:

holding the particles in contact with one another;

generating an alternating electric current;

exposing a collector of a flux concentrator to an alternating magnetic field generated by the alternating electric current; and focusing the alternating magnetic field with a tip of the flux concentrator so that the particles are exposed to the alternating magnetic field generated by the alternating magnetic current and focused with the tip so that they heat and join.

16. A method of sintering small particles, comprising:

holding the particles in contact with one another;

generating an alternating electric current; and exposing the particles to an alternating magnetic field generated by the alternating electric current so that they heat and join, wherein the particles are exposed to two different frequencies that cause joining of two different parts, respectively, of the particles, wherein a high-frequency heats a part of the particles with smaller particles and a low frequency heats a part of the particles with larger particles, wherein the two frequencies occur simultaneously.

* * * * *